(12) United States Patent
Nagai et al.

(10) Patent No.: US 6,324,513 B1
(45) Date of Patent: Nov. 27, 2001

(54) SPOKEN DIALOG SYSTEM CAPABLE OF PERFORMING NATURAL INTERACTIVE ACCESS

(75) Inventors: Akito Nagai; Keisuke Watanabe; Yasushi Ishikawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/404,302

(22) Filed: Sep. 24, 1999

(30) Foreign Application Priority Data

Jun. 18, 1999 (JP) .................................................. 11-172947

(51) Int. Cl.[7] .................................................. G10L 15/00
(52) U.S. Cl. .......................... 704/275; 704/270; 704/256
(58) Field of Search .................................. 704/246, 251, 704/256, 270, 272, 275

(56) References Cited

U.S. PATENT DOCUMENTS

| | | | | |
|---|---|---|---|---|
| 4,783,803 | * | 11/1988 | Baker et al. ........................ | 704/252 |
| 5,615,296 | * | 3/1997 | Stanford et al. ..................... | 704/201 |
| 5,694,558 | * | 12/1997 | Sparks et al. ........................ | 345/326 |
| 6,044,347 | * | 3/2000 | Abella et al. ........................ | 704/272 |
| 6,246,981 | * | 6/2001 | Papineni et al. ..................... | 704/235 |
| 6,246,986 | * | 6/2001 | Ammicht et al. .................... | 704/270 |

FOREIGN PATENT DOCUMENTS

| | | |
|---|---|---|
| 6208389 | 7/1994 | (JP) . |
| 9114493 | 5/1997 | (JP) . |

OTHER PUBLICATIONS

P.D. Jaramillo, et al., (US WEST Advanced Technologies, Inc.)proc. IVTTA 96, pp. 125–128.
F. Seide and A. Kellner, (Phillips) proc. Eurospeech 97, pp. 1327–1330.

\* cited by examiner

Primary Examiner—William Korzuch
Assistant Examiner—Daniel Abebe

(57) ABSTRACT

There is provided a spoken dialog system, in which an interactive operation is effectively carried out in a natural manner as to a speech containing words out of a set vocabulary. The spoken dialog system is arranged by comprising: an input storing unit for storing therein an input voice; a dictionary storing unit for classifying a key word to be recognized every item so as to define the classified key word; a dictionary selecting unit for selecting a key word from the dictionary storing unit to thereby output the selected key word as a recognized dictionary; a voice recognizing unit for recognizing the input voice with employment of the recognized dictionary selected from the dictionary selecting unit, and for outputting the extracted key word candidate in combination with the recognition section; a confirmed history storing unit for storing therein a key word candidate confirmed by a user as a determined key word; and a dialog managing unit for judging as to whether or not an input voice other than the determined key word is again recognized and for executing such operations that when the judgment result is the recognition to be once again performed, both an item and the determined key word are transferred as dictionary selection information to the dictionary selecting unit, and a section of an input voice other than the determined key word is updated as a re-recognition section. The updated confirmation section is also instructed to the voice recognizing unit.

12 Claims, 22 Drawing Sheets

FIG. 2

ITEM : TOWN NAME

| KEY WORD | LABEL |
|---|---|
| ...... | ...... |
| ONARI MACH | KAMAKURA CITY |
| OHMACHI | KAMAKURA CITY |
| KITAKAMAKURA | KAMAKURA CITY |
| OHFUNA | KAMAKURA CITY |
| ...... | ...... |

ITEM : CITY NAME

| KEY WORD | LABEL |
|---|---|
| ... | ... |
| CHIBA CITY | CHIBA PREF. |
| ... | ... |
| KAWASAKI CITY | KANAGAWA PREF. |
| YOKOHAMA CITY | KANAGAWA PREF. |
| KAMAKURA CITY | KANAGAWA PREF. |
| FUJISAWA CITY | KANAGAWA PREF. |
| ... | ... |

ITEM : PREFECTURE NAME

| KEY WORD |
|---|
| HOKKAIDO |
| AOMORI PREF. |
| IWATE PREF. |
| ... |
| CHIBA PREF. |
| TOKYO |
| KANAGAWA PREF. |
| ... |

FIG. 3

| RECOGNITION ORDER | KEY WORD CANDIDATES | STARTING TERMINAL POSITION | END TERMINAL POSITION | ACOUSTIC LIKELIHOOD DEGREE |
|---|---|---|---|---|
| 1 | KAMAKURA CITY | 25 | 170 | 0.0 |
| 2 | KAWASAKI CITY | 25 | 176 | 12.0 |
| 3 | FUJISAWA CITY | 195 | 342 | 26.8 |
| 4 | YOKOHAMA CITY | 401 | 560 | 31.2 |
| ...... | ...... | ...... | ...... | ...... |

FIG. 4

| SPEECH NUMBER | DETERMINED KEY WORD |
|---|---|
| 1 | ⟨PREFECTURE NAME : KANAGAWA KEN⟩ |
| 2 | ⟨CITY NAME : KAMAKURA SHI⟩ |
| ⋮ | ⋮ |

FIG. 7

| RECOGNITION ORDER | FUNCTIONAL WORD CANDIDATES | STARTING TERMINAL POSITION | END TERMINAL POSITION | ACOUSTIC LIKELIHOOD DEGREE |
|---|---|---|---|---|
| 1 | "NO" (CASE PARTICLE, "NO") | 171 | 186 | 0.0 |
| 2 | "KA" (CASE PARTICLE, "KA") | 25 | 41 | 1.0 |
| 3 | "NODESUNE" (CASE PARTICLE, "NO") + (AUXILIARY VERB, "DESU", TERMINATION) + (TERMINATION PARTICLE, "NE") | 171 | 252 | 36.2 |
| 4 | "NIARU" (PARTICLE, "NI") + (VERB, ATTRIBUTIVE MODIFICATION) | 211 | 282 | 60.7 |
| ... | ... | | | |

FIG. 11

RULE 1 (PREFECTURE NAME) :
(CITY NAME), (TOWN NAME), (SUBJECT NAME)

RULE 2 (CITY NAME) :
(TOWN NAME), (BUSINESS SORT CATEGORY), (SUBJECT NAME)

RULE 3 (TOWN NAME) :
(BUSINESS SORT CATEGORY), (SUBJECT NAME), (PERSONAL NAME)

RULE 4 (BUSINESS SORT CATEGORY) :
(SUBJECT NAME)

| | ITEM CHAIN | CHAIN PROBABILITY |
|---|---|---|
| CHAIN 1 | (PREFECTURE NAME)<br>(CITY NAME) | 0.75 |
| CHAIN 2 | (PREFECTURE NAME)<br>(TOWN NAME) | 0.20 |
| CHAIN 3 | (PREFECTURE NAME)<br>(SUBJECT NAME) | 0.04 |
| CHAIN 4 | (PREFECTURE NAME)<br>(PERSONAL NAME) | 0.01 |
| CHAIN 5 | (CITY NAME)<br>(TOWN NAME) | 0.30 |
| CHAIN 6 | (CITY NAME)<br>(BUSINESS SORT CATEGORY) | 0.25 |
| CHAIN 7 | (CITY NAME)<br>(SUBJECT NAME) | 0.45 |
| | ⋮ | ⋮ |

FIG. 15

|  | ITEM FUNCTIONAL WORD CHAIN | CHAIN PROBABILITY |
|---|---|---|
| CHAIN 1 | (PREFECTURE NAME) "NO" (CITY NAME) | 0.65 |
| CHAIN 2 | (PREFECTURE NAME) "NO" (TOWN NAME) | 0.15 |
| CHAIN 3 | (PREFECTURE NAME) "NO" (BUSINESS SORT CATEGORY) | 0.02 |
| CHAIN 4 | (PREFECTURE NAME) "NI-ARU" (CITY NAME) | 0.03 |
| CHAIN 5 | (PREFECTURE NAME) "NAN-DESUGA" (CITY NAME) | 0.08 |
| CHAIN 6 | (CITY NAME) "NO" (SUBJECT NAME) | 0.25 |
| CHAIN 7 | (TOWN NAME) "NO" (PERSONAL NAME) | 0.40 |
| CHAIN 8 | (TOWN NAME) "NI-ARU" (PERSONAL NAME) | 0.00 |
| CHAIN 9 | (TOWN NAME) "NI-ARU" (SUBJECT NAME) | 0.51 |
| ⋮ | ⋮ | ⋮ |

FIG. 19

|  | FUNCTIONAL WORD COOCCURRENCE | COOCCURRENCE PROBABILITY |
|---|---|---|
| COOCCURRENCE 1 | "NO NAN-DESUGA" | 0.33 |
| COOCCURRENCE 2 | "NO DESU" | 0.25 |
| COOCCURRENCE 3 | "NI DESU" | 0.00 |
| COOCCURRENCE 4 | "NI-ARU DESUGA" | 0.31 |
| COOCCURRENCE 5 | "NI-ARU ONEGAISHIMASU" | 0.38 |
| COOCCURRENCE 6 | "DE DESU" | 0.29 |
| COOCCURRENCE 7 | "DE DE" | 0.01 |
| ⋮ | ⋮ | ⋮ |

SPOKEN DIALOG SYSTEM CAPABLE OF PERFORMING NATURAL INTERACTIVE ACCESS

BACKGROUND OF THE INVENTION

1. Field of the Invention

The present invention generally relates to a spoken dialog system capable of performing automated answering operation in voice or speech by recognizing a speech of a speaker. More specifically, the present invention is directed to a voice automated answering apparatus capable of providing voice (speech) services such as information provisions and reservation business over the telephone to users.

2. Description of the Related Art

As man-to-machine interface techniques introduced in information systems, needs for voice (speech) interactive techniques have been more and more increased. The voice interactive techniques may realize automated answering systems capable of performing interactive operations between users and automated answering systems by way of voices. As an application system of this man-to-machine interface technique, for instance, telephone voice automated answering apparatuses are known by which various information required by users may be provided, and also various sorts of services may be carried out on behalf of operators. While these telephone voices automated answering apparatuses are popularized, 24-hour services are available, business efficiencies are increased, and man power may be reduced.

Generally speaking, such a spoken dialog system is typically arranged by a voice recognizing unit for recognizing a speech of a user, a dialog managing unit for managing an interactive operation executed between the user and this spoken dialog system, and a voice synthesizing unit for notifying an answer made by this spoken dialog system in the form of voice. Also, a vocabulary to be recognized by the voice recognizing unit is set as a recognized dictionary.

In this system, the speech (voice) recognition precision of the voice recognizing unit has a close relationship with a scale of a vocabulary to be recognized. The larger the scale of the vocabulary becomes, the higher the recognition difficulty is increased. As a consequence, when all of the words which may be predicted to be produced by the user are set as a recognized dictionary, large numbers of word recognition error will occur, and the total number of recognition operations about confirmed results to the user is increased, so that the interactive operation is carried out in a very low efficiency. Furthermore, the interactive operation between the user and the spoken dialog system cannot be continued and will be destroyed, so that the goal of the dialog of the user cannot be achieved.

As a consequence, in the conventional spoken dialog system, in order to maintain recognition precision at high degrees while executing an interactive operation, a recognized vocabulary is changed based on the context of the interactive operation, and recognized dictionaries are replaced. Thus, the recognition operation for the next speech made by the user may be prepared.

The method for changing a recognized vocabulary used under a certain interactive condition into another vocabulary which may be produced in a next speech by a user may be mainly classified into following two methods in accordance with ways how the interactive operation proceeds between the user and the spoken dialog system.

As one interactive method, there is a system initiative type interactive operation in which interactive operations proceed in such a manner which a system mainly inquires of a user and the user answers this inquiry. In this case, the system may determine the flow of the interactive operation, and the recognized vocabulary with respect to the next speech by the user is basically set with respect to each of interactive conditions when the interactive procedure is designed.

As another interactive method, there is a user initiative type interactive operation in which interactive operations proceed in such a manner that a user mainly inquires of a system and the system answers this inquiry. In this case, since free inquires are performed by the user, it is practically difficult to determine the flow of the interactive operation at the system designing stage. The recognized vocabulary with respect to the next speech by the user may be basically predicted in the dynamic manner from the context of the interactive operation, which corresponds to the histories such as the inquired content of the user and the system answer.

The prior art (will be referred to as "first prior art") related to the method for changing the recognized vocabulary in the above-explained system initiative type interactive operation is described by Japanese Laid-open Patent Application No. Hei-9-114493, for example, entitled "Interactive Control Apparatus" as shown in FIG. 21.

In FIG. 21, reference numeral 11 indicates a topic determining unit for determining a topic, and reference numeral 12 shows a recognized word predicting unit. This recognized word predicting unit 12 is equipped with a recognized word dictionary 121, a resemble word table 122, a word focusing table 123, a resemble word retrieving unit 124, and a focused word retrieving unit 135. The resemble word retrieving unit 124 retrieves resemble words contained in the confirmed word dictionary 121 by referring to the resemble word table 122. The focused word retrieving unit 125 checks as to whether or not a recognized word contained in a recognized word dictionary 121 is erroneously recognized with reference to the word focusing table 123 so as to retrieve such a recognized word which owns no history of erroneous recognition. Also, reference numeral 13 indicates a voice output sentence producing unit, reference numeral 14 shows a recognition control unit, and reference numeral 15 denotes a correct/incorrect judging unit.

In accordance with the first prior art shown in FIG. 21, the interactive operation smoothing technique is disclosed as an interactive example of the meeting room reservation service. That is, the total number of speech reissuing actions in the case that the erroneous confirmation happens to occur is reduced, and the interactive operation can be therefore carried out in a smooth way. As a concrete interactive operation, the system makes such an inquiry "KAIGI SHITSU MEI O DOZO (please let me know the name of the meeting room)" to the user. Then, the user speaks "KONA "A" DESU (It is corner "A")." As a result of speech recognition, when the system erroneously recognizes "KONA "B" DESU (it is corner "B")," the system confirms to the user, asking "KONA "B" DESU KA? (corner "B" is correct?)," and the user answers "IIE (No)."

In such a context of the interactive operation, the system does not urge the user to reenter the voice "MO ICHIDO OSSHATTE KUDASAI (please say it again)," but stores in advance such a resemble word into the resemble word table 122. This resemble word may be mistakenly recognized as the word "KONA "B" (corner "B")."

Then, for example, in such a case that the word "KONA "A" (corner "A")" resides as the resemble word "KONA "B" (corner "B")" in the lower-graded candidates of the recognized result, the system confirms, asking "KONA "A" DESU KA? (corner "A" is correct?)." As a result, the total number of speech reissuing operations when the erroneous recognition occurs can be reduced, and the next recognized word candidate can be quickly specified.

There are two sets of the below-mentioned methods for changing a recognized vocabulary.

First, when a system is designed, as a preset vocabulary, the following topics such as a name of a reserving person, a date, time when a meeting room is initiated for use, time when a meeting room is terminated for use, and a name of a meeting room are determined which are items required for reserving a meeting room. Also, this system is equipped with the recognized word dictionary 121 stored with a plurality of recognized words every subject so as to select such a recognized word corresponding to the candidate determined by the candidate determining unit 11.

Furthermore, in the case that the system makes an erroneous recognition, a history of the word which is denied since a user says "NO" is stored in the word focused table 123. Then, this system eliminates this denied word from the subsequent recognized vocabularies of the user. The foregoing description is related to the first prior art.

Next, a conventional method for changing a recognized vocabulary in the user initiative type interactive operation (will be referred to a "second prior art"), for instance, is described in Japanese Laid-open Patent Application No. 6-208389, entitled "Information Processing Method and Apparatus" as shown in FIG. 22.

In FIG. 22, reference numeral 301 indicates an interactive answer producing unit, reference numeral 302 shows a dialog managing unit, reference numeral 303 represents an information retrieving unit for retrieving a database, reference numeral 312 is a voice recognizing unit, and reference numeral 320 shows a recognized subject producing unit. This recognized subject producing unit 320 is equipped with a stationary word dictionary unit 304, a stationary grammar unit 305, a next speech predicting word dictionary producing unit 306, a retrieve content word dictionary producing unit 307, a word reading unit 308, a dynamic grammar unit 309, a dynamic grammar selecting unit 310, and a recognized subject sentence producing unit 311.

That is, while the word dictionaries and grammars for accepting an entry by means of speech during any interactive operation so as to recognize a voice are produced by the stationary word dictionary unit 34 and the stationary grammar unit 305, the word dictionaries for accepting an entry which is dynamically changed as an interactive operation proceeds so as to recognize a voice are produced by the next speech word dictionary producing unit 306 and the retrieve content word dictionary producing unit 307. Also, the grammar is produced in the recognized subject sentence producing unit 311 by employing the dynamic grammar selecting unit 310 rather than the dynamic grammar unit 309 in response to a content of a produced word dictionary.

In the second prior art shown in FIG. 22, the interactive operation about the travel information retrieving operation is carried out by way of example, and the entry by the user during the interactive operation is classified into two sorts of travel information retrieving operations.

That is to say, such unfocused questions as "what item is available?", and also such very global questions (namely, very loose question) as "golf playgrounds located in Tokyo, please" may be made at any time when a user performs an interactive operation. As a result, these questions are handled as a stationary vocabulary in a recognized vocabulary.

Also, other questions related to detailed contents such as "a telephone number of YUMOTO ONSEN hot spa at HAKONE, please" and "what is an address of the hot spa located at YOSHII-MACHI of GUNMA?" are dynamically changed as the interactive operation proceeds. As a result, these questions are handled as a dynamic vocabulary in a recognized vocabulary.

As previously explained, the recognized vocabulary is divided into the stationary vocabulary and the dynamic vocabulary. The word contained in the next speech is predicted based upon the retrieved result and the content of the interactive operation so that the dynamic vocabulary is changed.

As previously explained, in accordance with both the first prior art and the second prior art, the recognized vocabulary is changed based upon the context of the interactive operation, and the recognized dictionaries are replaced so as to accept the recognition of the next speech issued by the user. However, the following case is conceivable. That is, a user who tries to execute an interactive operation with the system will make a speech related to a vocabulary in a recognized dictionary of the next speech, and at the same time, will make a voice related to an item not to be recognized.

For example, in the meeting room reservation in the first prior art, when the system inquires the user of "KAIGISH-ITSU MEI O DOSO (please enter the name of the meeting room)", some user may answer "KONA "A" O 10-JI KARA (corner "A" from 10 a.m.), please". At this time, since that "KONA "A" (corner "A")" is correctly recognized by the system, this system will make such a question to the user, "NANJI KARA OTSUKAI DESUKA (what time will you use)?" related to the starting time of using the meeting room which is the not-yet-acquired item.

In such a context or the interactive operation, since the starting time of using the meeting room is again inquired by the system, the user must again enter the same item, so that the interactive operation is carried out in a very low efficiency.

Furthermore, it is unnatural for a user to be once again inquired of the item that the user believes has been entered. This may cause the user to be confused. In a response, the user says, for instance, "E? SAKKI IIMASHITA KEDO (What? I've already said it)." The system fails to confirm this voice, because this voice is out of the recognized vocabulary, and answers "MO ICHIDO OSSHATE KUDASAI (please say it again)". Subsequently, the user again says "SAKKI IIMASHITA KEDO (I've already said it)", while the user cannot understand that this vocabulary is out of the recognized vocabulary. As a result, this condition may cause such a problem that such an interactive operation will be repeatedly performed, and the goal of the dialog cannot be completed.

Similarly, in the second prior art, in the speech containing words out of the predicted vocabulary for the next speech, the words out of the vocabulary cannot be accepted. As a consequence, there is another problem that the information contained in these words cannot be effectively utilized in the interactive operation.

SUMMARY OF THE INVENTION

The present invention has been therefore made to solve the above-described problems of the first and second prior art, and an object of the present invention is to provide a spoken dialog system capable of extracting words out of a set vocabulary in response to a speech containing the words out of the set vocabulary in addition to words set as a recognized dictionary. As a consequence, the extracted words can be effectively utilized so as to more efficiently and more naturally improve an interactive operation.

According to the present invention, a spoken dialog system comprises: an input storing unit for storing therein an input voice in combination with time information; a dictionary storing unit for classifying a key word to be recognized every item so as to define the classified key word; a dictionary selecting unit for selecting a key word corresponding to designated dictionary selection information from the above dictionary storing unit to thereby output the selected key word as a recognized dictionary; a voice recognizing unit for recognizing the input voice in the above input storing unit with respect to the above input voice or a designated recognition section with employment of the recognized dictionary selected from the above dictionary selecting unit, and for outputting the extracted key word candidate in combination with the recognition section; a confirmed history storing unit for storing therein a history of a determined key word every speech; and a dialog managing unit for causing a user to confirm the key word candidate outputted from the above voice recognizing unit; for registering the confirmed key word candidate as a determined key word into the above confirmed history storing unit; for judging as to whether or not an input voice other than the determined key word is recognized based upon both a section of the determined key word and a recognition section thereof; and for executing such operations that when the judgment result is the recognition to be once again, both an item and the determined key word are transferred as dictionary selection information to the above dictionary selecting unit; a section of an input voice other than the determined key word is updated as a re-recognition section; and also the updated confirmation section is instructed to the above voice recognizing unit, whereas when the judgment result is not the recognition to be once again performed, a predetermined interactive operation is carried out in response to the determined key word.

According to another aspect of the present invention, a spoken dialog system further comprises: a key word position evaluated value storing unit for storing therein an evaluated value with respect to a key word extracted position; and a candidate selecting unit provided between the above voice recognizing unit and the above dialog managing unit, for referring to an evaluated value with respect to a position of a key word candidate derived from the above voice recognizing unit from the above key word position evaluated value storing unit, and for selecting a key word candidate to be confirmed by a user from a plurality of key word candidates corresponding to the confirmed result to thereby send the selected keyword candidate to the above dialog managing unit.

According to still another aspect of the present invention, a spoken dialog system is characterized in that: the above spoken dialog system further comprises: a functional word storing unit for storing therein a word other than a key word as a functional word in combination with language information; a connection knowledge storing unit for storing therein a connection relationship between an item and a functional word; and a functional word extracting unit provided between the above input storing unit and the above dialog managing unit, for referring to the above functional word storing unit so as to extract a functional word candidate from the input voice stored in the input storing unit, and for sending the extracted functional word to the above dialog managing unit; and that the above dialog managing unit selects a functional word candidate connectable to a determined key word by referring to the connection relationship of the above connection knowledge storing unit; and updates a recognition section in a recognition once again performed by referring to time information of the above functional word candidate.

According to still another aspect of the present invention, a spoken dialog system further comprises a functional word position evaluated value storing unit for storing therein an evaluated value at a position of a functional word, and is characterized in that the above functional word extracting unit selects a functional word candidate by referring to the evaluated value in the above functional word position evaluated value storing unit.

According to still another aspect of the present invention, a spoken dialog system further comprises an item existence evaluated value storing unit for storing therein an evaluated value with respect to existence of items located before/after a functional word, and is characterized in that the above dialog managing unit updates a recognition section in a recognition once again performed by referring to both a functional word candidate in a voice section other than a section occupied by a determined key word, and an item existence evaluated value in the above item existence evaluated value storing unit, which corresponds to the above functional word candidate.

According to still another aspect of the present invention, a spoken dialog system further comprises an item relationship rule storing unit for storing therein a cooccurrence relationship among items as an item relationship rule, and is characterized in that the above dictionary selecting unit selects an item capable of satisfying the item relationship rule in the above item relationship rule storing unit among not-yet-confirmed items as an item to be again recognized; and selects a key word corresponding to both the item to be again recognized and a determined key word from the above dictionary storing unit to thereby provide the selected key word as a recognized dictionary to the above voice recognizing unit.

According to still another aspect of the present invention, a spoken dialog system further comprises an item chain evaluated value storing unit for storing therein an evaluated value with respect to an item chain, and is characterized in that the above dictionary selecting unit employs the item chain evaluated value in the above item chain evaluated value storing unit as a reference used to select an item to be again recognized among not-yet-confirmed items so as to select a key word corresponding to both the item to be again recognized and the determined key word from the above dictionary storing unit.

According to still another aspect of the present invention, a spoken dialog system further comprises an item/functional word chain evaluated value storing unit for storing therein an evaluated value of an item chain with respect to a set of an item and a functional word, and is characterized in that: the above dialog managing unit sends a functional word candidate connectable to a determined key word to the above dictionary selecting unit; and that the above dictionary selecting unit employs the item/functional word chain evaluated value in the above item/functional word chain evaluated value storing unit as a reference used to select an item to be again recognized among not-yet-confirmed items, so as to select a key word corresponding to both the item to be again recognized and the determined key word from the above dictionary storing unit.

According to still another aspect of the present invention, a spoken dialog system is characterized in that: the above dictionary selecting unit notifies the item of the determined key word and the item to be again recognized to the above voice recognizing unit; and that the above voice recognizing unit evaluates an item chain corresponding to a series of key word candidates equal to a recognition candidate by referring to the item chain evaluated value in the above item chain evaluated value storing unit.

According to still another aspect of the present invention, a spoken dialog system is characterized in that: the above dictionary selecting unit notifies both the item of the determined key word and the item to be again recognized to the above voice recognizing unit; that the above functional word extracting unit sends the functional word candidate extracted from the input voice in the above input storing unit to the above voice recognizing unit; and that the above voice recognizing unit evaluates an item chain corresponding to a series of key word candidates equal to a recognized candidate by referring to both the item/functional word chain evaluated value in the above item/functional word chain evaluated value and also the functional word candidate extracted from the above functional word extracting unit.

According to still another aspect of the present invention, a spoken dialog system further comprises a functional word cooccurrence evaluated value storing unit for storing therein an evaluated value of a cooccurrence relationship between functional words, and is characterized in that the above voice recognizing unit enters the functional word candidate from the above functional word extracting unit extracted from the input voice in the above input storing unit; and also evaluates a key word candidate equal to a recognized candidate and a series of functional word candidates by referring to the functional word cooccurrence evaluated value in the above functional word cooccurrence value storing unit.

According to still another aspect of the present invention, a spoken dialog system further comprises: an acoustic model storing unit for storing therein an acoustic parameter in correspondence with a language unit; and a speaker adaptive unit for reading out from the above input storing unit an input voice corresponding to a section of a determined key word by referring to both a language expression and a section of a determined key word entered from the above dialog managing unit, and for learning a parameter of an acoustic model by employing the input voice and the language expression of the determined key word to thereby update the learned parameter of the above acoustic model, and is characterized in that the above voice recognizing unit recognizes an input voice by employing the updated parameter of the acoustic model derived from the above speaker adaptive unit.

BRIEF DESCRIPTION OF THE DRAWINGS

For a better understanding of the present invention, reference is made of a detailed description to be read in conjunction with the accompanying drawings, in which:

FIG. 2 is an explanatory diagram for explaining an example of definitions about key words used in a dictionary storing unit 6 shown in FIG. 1;

FIG. 3 is an explanatory diagram for explaining an example of recognition results outputted from a voice recognizing unit 2 shown in FIG. 1;

FIG. 4 is an explanatory diagram for explaining an example of a confirmed key word history saved in a confirmed history storing unit 4 shown in FIG. 1;

FIG. 7 is an explanatory diagram for explaining an example of extracted results of a functional word extracting unit 10 shown in FIG. 6;

FIG. 11 is a structural diagram for representing an example of item relationship rules employed in an item relation rule storing unit 14 shown in FIG. 10;

FIG. 13 is an explanatory diagram for explaining an example of an item chain table saved in an item chain evaluated value storing unit 15 shown in FIG. 12;

FIG. 15 is an explanatory diagram for explaining an example of an item/functional word chain table saved in an item/functional word chain evaluated value storing unit 16 shown in FIG. 14;

FIG. 19 is an explanatory diagram for explaining an example of a functional word cooccurrence table saved in a functional word cooccurrence evaluated value storing unit 17 shown in FIG. 18;

DETAILED DESCRIPTION OF THE PREFERRED EMBODIMENTS

Figure 1:
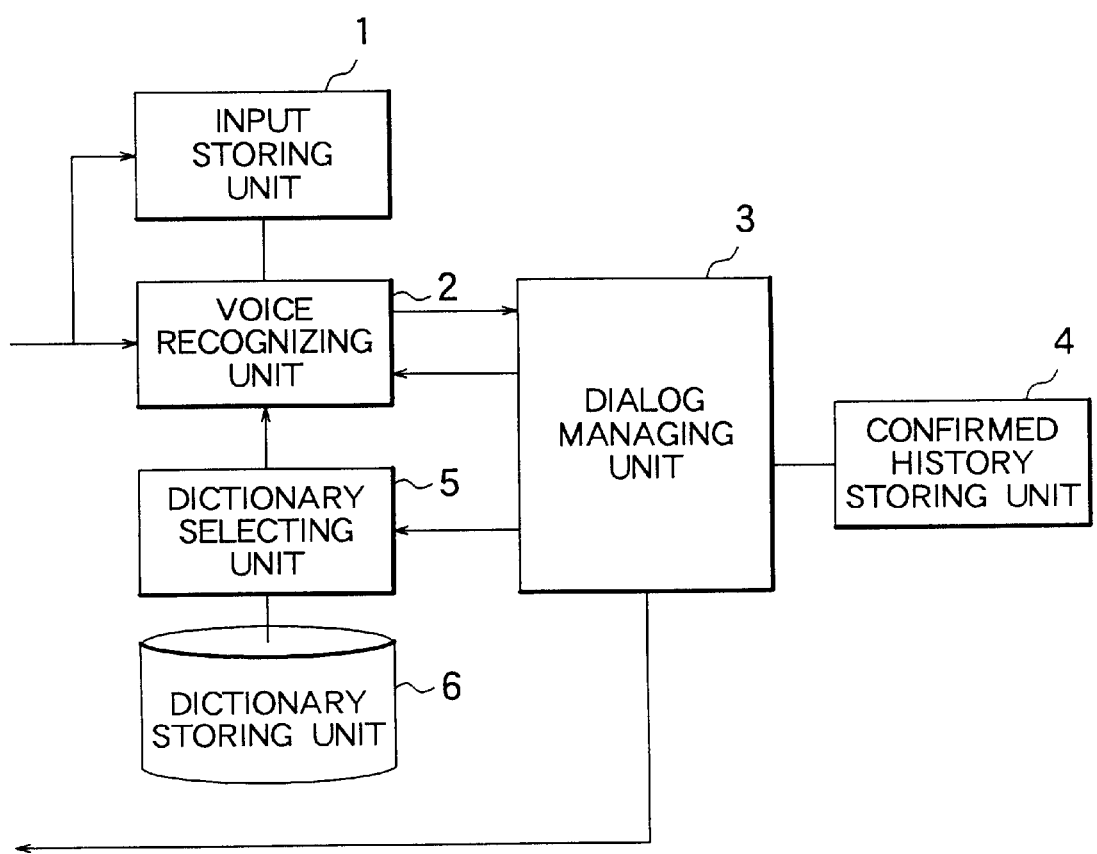
FIG. 1 is a schematic block diagram for representing an arrangement of a spoken dialog system according to Embodiment 1 of the present invention.

Referring now to the drawings, spoken dialog systems according to various preferred embodiment modes of the present invention will be described in detail.

Embodiment 1

FIG. 1 is a schematic block diagram for showing an arrangement of a voice (speech) interactive system according to Embodiment 1 of the present invention. This spoken dialog system is constituted by an input storing unit 1 for storing therein a voice entered by a user, a voice recognizing unit 2, a dialog managing unit 3, a confirmed history storing unit 4, a dictionary selecting unit 5, and a dictionary storing unit 6. The voice recognizing unit 2 recognizes either the entered voice or an input voice in the input storing unit 1 with respect to a designated recognition section, and outputs a key word candidate to the dialog managing unit in combination with the recognition section. The dialog managing unit 3 causes a user to confirm a key word candidate, and judges as to whether or not a voice section other than a confirmed determined key word section is recognized again. When this voice section is recognized again, the dialog managing unit 3 sends dictionary selection information to the dictionary selecting unit 5, and also updates the recognition section to notify a recognition instruction to the voice recognizing unit 2. The confirmed history storing unit 4 stores therein a history of a determined key word confirmed by the dialog managing unit 3. The dictionary selecting unit 5 selects a key word to be recognized from the dictionary storing unit 6 in accordance with the dictionary selection information, and then provides the selected key word as a recognized dictionary to the voice recognizing unit 2. The dictionary storing unit 6 is arranged in such a manner that a key word to be recognized is classified as an item, and the key word is defined.

Subsequently, operation of the above-described spoken dialog system according to Embodiment 1 will now be explained, while exemplifying an automatic telephone number guiding service.

First, in the telephone number guiding service, a user enters the following items as a retrieve condition for a subject whose telephone number is desirably notified: addresses including a prefecture name as one of local administration divisions in the administrative prefectures in Japan, e.g., Tokyo, Hokkaido, a city name as a local government under the administrative prefectures in Japan, a town name as a local public entity under the local government; a business category used for classification by occupation; and titles to be retrieved, e.g., a shop name, a company name, a name of a public organization, and a personal name. In response to this entry, the spoken dialog system retrieves a subject coincident with a retrieval condition from a database to acquire a desired telephone number, and then notifies this resultant telephone number of the user as a voice guidance. In this manner, the user may know the desired telephone number.

In this embodiment, a system initiative type interactive operation will now be described by way of example as a concrete interactive operation.

This interactive system successively inquires the above-described input information to the user, whereas the user successively answers these inquiries, so that the interactive operation proceeds as follows:

SYSTEM: "KEN MEI O DOZO (please enter prefecture name)"

USER: "KANAGAWA KEN DESU (KANAGAWA prefecture)"

SYSTEM: "KANAGAWA KEN DESUNE (KANAGAWA prefecture is correct?)"

USER: "HAI (Yes)"

SYSTEM: "SHI NO NAMAE O DOSO (please enter city name)"

USER: "KAMAKURA-SHI DESU (KAMAKURA city)" ---(1)

SYSTEM: "KAMAKURA-SHI DESUNE (KAMAKURA city is correct?)"

USER: "HAI (Yes)"

SYSTEM: "GOANNAI SURU MEISYO WA NAN DESUKA (What is the destination to be guided?)" ---(2)

USER: "FURAWA SENTA DE ONEGAI SHIMASU ("FLOWER CENTER," please)"

SYSTEM: "FURAWA SENTA DESUNE ("FLOWER CENTER" is correct?)"

USER: "HAI (Yes)"

SYSTEM: "SOREDEWA FURAWA SENTA NO DENWA BANGO O GOANNAI SHIMASU. BANGO WA, 000-XXXX DESU (the telephone number of "FLOWER CENTER" is 000-XXXX)

During this procedure, another may be contemplated. In (1), assume that the user speak "KAMAKURA-SHI NO FURAWA SENTA O ONEGAI SHIMASU" ---(3). In accordance with this embodiment, this spoken dialog system can first confirm the user about the key word city name "KAMAKURA-SHI", which corresponds to such an input item which is originally expected by this spoken dialog system, in response to the speech (3). Subsequently, the spoken dialog system can recognize again input voice sections other than the key word "KAMAKURA-SHI", while utilizing the confirmed "KAMAKURA-SHI" to focus a recognized vocabulary, and also can extract the key word "FURAWA SENTA." As a result, this spoken dialog system can realize a natural answer as explained in the below-mentioned (4) without requesting the user to reenter the same content:

SYSTEM: "SHI NO NAMAE O DOZO (enter name of city, please)"

USER: "KAMAKURA-SHI NO FURAWA SENTA O ONEGAI SHIMASU ("FLOWER CENTER" of KAMAKURA city, please) ---(3)

SYSTEM: "KAMAKURA-SHI DESU NE (KAMAKURA city is correct?)"

USER: "HAI (Yes)"

SYSTEM: "FURAWA SENTA DE YOROSHII DESUKA ("FLOWER CENTER" is correct?)" ---(4)

USER: "HAI (Yes)"

SYSTEM: "SOREDEWA FURAWA SENTA NO DENWA BANGO O GOANNAI SHIMASU. BANGO WA, 000-XXXX DESU (the telephone number of "FLOWER CENTER" is 000-XXXX)"

A general process operation of the spoken dialog system according to Embodiment 1 will now be described with reference to the above-explained interactive operation.

The input voice made by the user is sent to the input storing unit 1 so as to be stored therein in combination with time information, and furthermore, is supplied to the voice recognizing unit 2. It should be noted that the input voice stored into the input storing unit 1 may be a voice signal digitalized by an A/D conversion, or time sequential information of an analysis parameter corresponding to a voice analyzed result.

The dictionary storing unit 6 classifies key words to be recognized into items, and individually gives definitions of the key words to the items.

FIG. 2 illustratively shows an example of key word definitions established in the dictionary storing unit 6.

A key word is equal to such a word defined with respect to each of input items which constitute a retrieve condition. While there are prepared as the items, a prefecture name, a city name, a town name, a business category name, a shop name, a company name, a name of a public organization, a personal name and the like. A word belonging to each of these items is defined as a key word. As a mutual relationship among these items, for instance, a prefecture name is applied as a label to each of the key words belonging to the item of city name.

The dictionary selecting unit 5 receives both an item name to be recognized and a key word determined by executing an interactive operation as dictionary selection information from the dialog managing unit 3, selects such a key word corresponding to the designated dictionary selection information from the key words classified based upon the items of the dictionary storing unit 6 as a vocabulary to be recognized, and then provides the selected key word as a recognized dictionary to the voice recognizing unit 2.

As an example, the dictionary selection information is expressed by three sets of (a) an item to be recognized; (b) a determined key word list for storing therein the previously determined key words in the determined order; and (c) a recognized identifier.

In this case, the first set (a) indicates such an input item which is originally expected by the spoken dialog system in response to a speech of a user. For instance, in the case that the spoken dialog system requests the user to input "SHI NO NAMAE O DOZO (please enter city name)," this input item corresponds to the item of "CITY NAME" used as the recognition subject. The second set (b) corresponds to a list of all of the determined key words which have been determined since an interactive operation was commenced. The third set (c) corresponds to such a flag for indicating as to whether or not recognition is made once again. When the recognition is once again made, this flag is set to "1", whereas when the recognition is not once again made, this flag is set to "0".

In this case, a first description will now be made of such a case that the recognition is not once again carried out. The interactive operation when the recognition is once again carried out will be discussed later.

The dictionary selection operation is performed as follows; for instance, in the above-described example of interactive operation, when the entry of "KAMAKURA-SHI NO FURAWA SENTA O ONEGAI SHIMASU ("FLOWER CENTER" of KAMAKURA city), please" --- (3) is recognized, since "KANAGAWA KEN (KANAGAWA prefecture)" has already been determined as the prefecture name, the dialog managing unit 3 defines the item to be recognized as "SHI MEI (city name)," stores "KANAGAWA KEN (KANAGAWA prefecture)" into the determined key word list, and sets the recognition identifier to "0", and then transfers this dictionary selection information to the dictionary selecting unit 5. When the recognition identifier is equal to "0", the dictionary selecting unit 5 refers to a prefecture name which is applied to such a key word as belonging to the item of "SHI MEI (city name)" so as to select key words of names of the cities located in KANAGAWA prefecture as a recognized vocabulary. Then, the dictionary selecting unit 5 provides this recognized vocabulary to the voice recognizing unit 2 as a recognized dictionary.

The voice recognizing unit 2 receives the recognized dictionary, in which the key word to be recognized is defined, from the dictionary selecting unit 5, recognizes the input voice with employment of this recognized dictionary, and then extracts a plurality of key word candidates in the order of better acoustic likelihood degrees. These key word candidates are assigned both acoustic likelihood degrees and positional information of key word sections. The dialog managing unit 3 provides a recognition section using the whole length of the input voice as an initial value until the next speech of the user is subsequently input and the input voice is updated.

FIG. 3 illustratively indicates the following confirmation result. That is, the spoken dialog system recognizes the entry of "KAMAKURA-SHI NO FURAWA SENTA O ONEGAI SHIMASU ("FLOWER CENTER" of KAMAKURA city, please) --(3)" in the above-explained example of the interactive operation with employment of the recognized dictionary in which the key words of the names of the cities located in KANAGAWA prefecture. In this example, an acoustic likelihood degree implies that the smaller the numerical value of this acoustic likelihood degree becomes, the higher an acoustic certainty is established. Also, both a starting terminal position and an end terminal position imply temporal absolute positions within an input voice. A set of such key word candidates is outputted to the dialog managing unit in connection with recognition section information.

The dialog managing unit 3 confirms the user about the key word candidate selected from the set of these key word candidates by way of the confirmation interactive operation. For example, the dialog managing unit 3 selects "KAMAKURA-SHI (KAMAKURA city)" corresponding to the first recognized order among the key word candidates shown in FIG. 3, and inquires the user "KAMAKURA-SHI DESUNE (KAMAKURA city is correct?)". When the answer made from the user is "NO", the dialog managing unit 3 confirms "KAWASAKI-SHI (KAWASAKI city)" corresponding to the key word candidate of the next order. On the other hand, when the answer made from the user is "YES", the dialog managing unit 3 registers "KAMAKURA-SHI (KAMAKURA city)" of the key word candidate into the confirmed history storing unit 4 as a determined key word in combination with the item made to be recognized.

As shown in FIG. 4, in the confirmed history storing unit 4, a history of determined key words is saved every speech of the user. At this time, in such a case that a plurality of determined key words are located in a single speech, all of the determined key words as saved within the same speech number.

When as a result of confirmed interactive operation, the user can agree and the key word is determined, the dialog managing unit 3 judges as to whether or not an input voice section other than the determined key word is once again recognized by referring to both the starting terminal position and the end terminal position of the determined key word, and furthermore a whole length of the input voice. The recognition judgment is again carried out by the dialog managing unit 3 as follows: For instance, while a predetermined length as the recognition section length is used as a reference value, in such a case that a length of an input voice section other than the determined key word is longer than this reference value, the dialog managing unit 3 once again performs the recognition judgment. When this length of the input voice section is shorter than or equal to the reference value, the dialog managing unit 3 performs again the not-recognition judgment.

As a result, when the dialog managing unit 3 judges that the recognition of the input voice section is once again carried out, the recognition identifier is set to "1"; the determined key word "KAMAKURA-SHI (KAMAKURA city)" confirmed by the interactive operation is added to the determined key word list; and this determined key word is transferred as the dictionary selection information to the dictionary selecting unit 5 together with the item "SHI MEI (city name)" to be recognized. Furthermore, while the dialog managing unit 3 sets the input voice section other than the determined key word as the recognition section, the recognition section is updated, and the updated recognition section is notified to the voice recognizing unit 2 in combination with a confirmation instruction. Then, the dialog managing unit 3 waits for the recognized result derived from the voice recognizing unit 2. To the contrary, when the dialog managing unit 3 judges that the recognized of the input voice section is not once again carried out, this dialog managing unit 3 refers to the confirmed history storing unit 4. In such a case that only one determined key word is acquired with respect to the input voice to be recognized, another interactive operation for acquiring a key word related to an item which has not been yet acquired is continued. Also, in the case that a plurality of determined key words are acquired by recognizing again the input voice to be recognized, the dialog managing unit 3 omits an inquiry about the determined key word acquired by the recognition again, and makes such a response as the above-described example (4) of the interactive operation by using this determined key word.

In the case that the recognition identifier is equal to "1" (namely, recognition is once again performed), the dictionary selecting unit 5 refers to the determined key word list of the dictionary selection information so as to eliminate the item corresponding to the determined key word. The spoken dialog system selects the key word related to the item which has not been yet acquired from the dictionary storing unit 6, and then provides the selected key word to the voice recognizing unit 2 as a recognized dictionary to carry out a recognition once again. In this case, a recognized vocabulary is limited by employing the information about the latest determined key word which has been confirmed by the interactive operation with respect to the recognized vocabulary selected as the not yet acquired item. For example, the spoken dialog system selects only such a key word to which the label of the latest determined key word "KAMAKURA-SHI (KAMAKURA city)" is assigned with respect to the items such as "CHO-SON MEI (town name)", "GYOSHU CATEGORI (business category)", and "TAISHO MEI (subject name)" except for the item "KEN MEI (prefecture name)" which is determined as "KANAGAWA-KEN (KANAGAWA prefecture)", and the item "SHI MEI (city name)" which should be recognized in response to the entry of "KAMAKURA-SHI NO FURAWA SENTA O ONEGAI SHIMASU (please let me know "FLOWER CENTER" of KAMAKURA city)" (3) in the above-explained example of the interactive operation.

Upon receipt of the recognition instruction issued form the dialog managing unit 3, the voice recognizing unit 2 reads the input voice corresponding to the designated recognition section from the input storing unit 1, and recognizes the read input voice by employing the recognized dictionary for the recognition again which is provided by the dictionary selecting unit 5, and furthermore, outputs a key word candidate set to the dialog managing unit 3 as a once again recognized result.

As previously described in accordance with Embodiment 1, even when the key word out offhand the vocabulary to be recognized is contained in the speech made by the user, the same input voice is recognized once again by employing the recognized dictionary of the vocabulary related to the key word which is confirmed by the user, and thus, such a key word out of the vocabulary to be recognized can be extracted. As a consequence, the spoken dialog system of this embodiment 1 can provide an effective interactive operation and a more natural introduction of the interactive operation by using the key word acquired by the recognition again.

Embodiment 2

Next, Embodiment 2 will now be explained.

Figure 5:
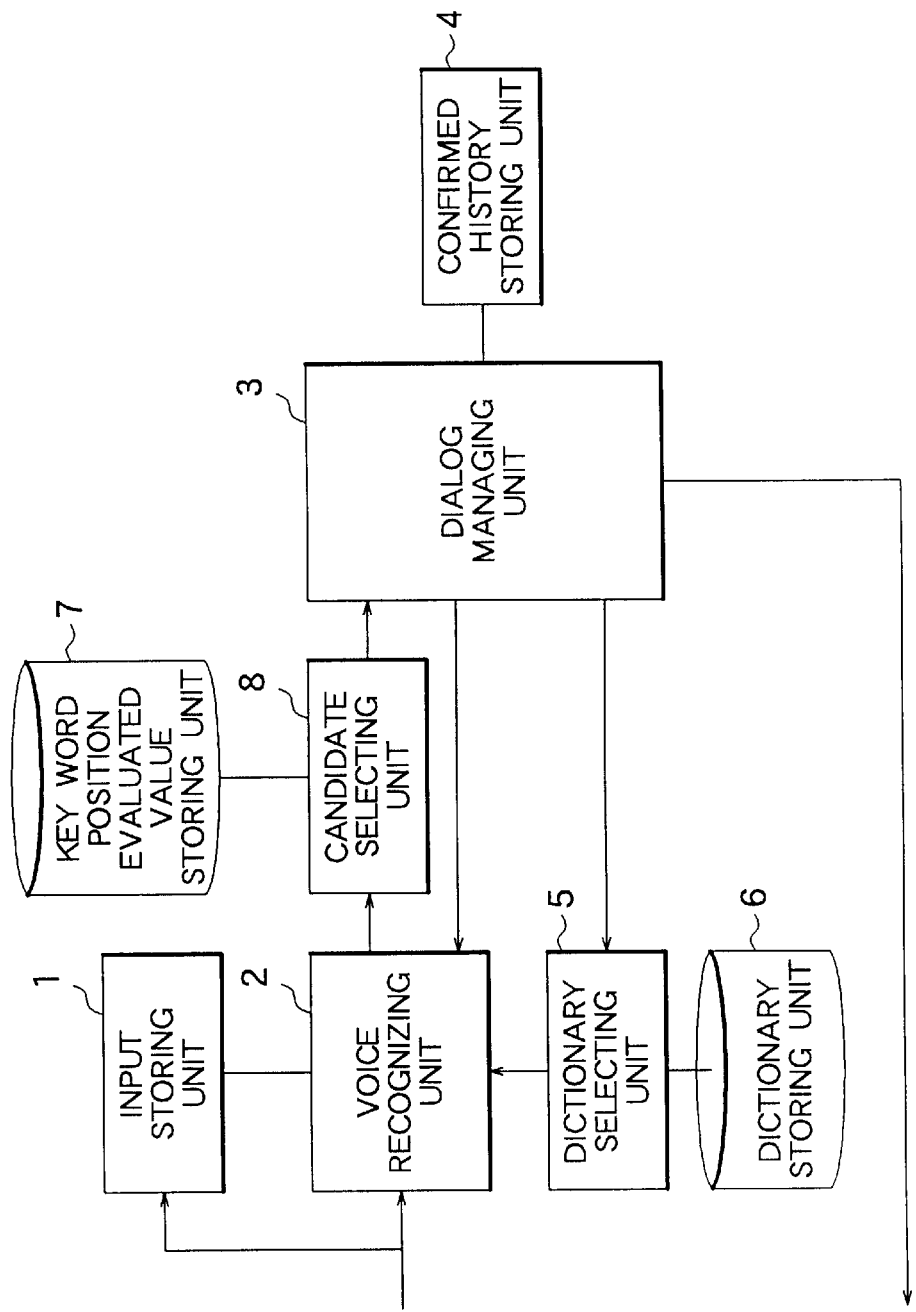
FIG. 5 is a schematic block diagram for showing an arrangement of a spoken dialog system according to Embodiment 2 of the present invention.

FIG. 5 is a schematic block diagram for representing an arrangement of a spoken dialog system according to Embodiment 2 of the present invention.

It should be understood that the same reference numerals shown in FIG. 1 will be employed as those for denoting the same, or similar structural portions of FIG. 5, and descriptions thereof are omitted. As new reference numerals, the following reference numerals are employed. Reference numeral 7 indicates a key word position evaluated value storing unit for storing therein an evaluated value with respect to a key word extracted position contained in a speech; and reference numeral 8 shows a candidate selecting unit for selecting a key word candidate to be confirmed by a user from a plurality of key word candidates corresponding to a recognized result with reference to the above-described evaluated value with respect to the key word candidate entered from the voice recognizing unit 2, and thereafter for sending the selected key word candidate to the dialog managing unit 3.

In this case, an evaluated value stored in the key word position evaluated value storing unit 7 is stored as an evaluated value with respect to a position of an item corresponding to a key word. For example, a speech section of a user is subdivided into three regions of a sentence opening, a sentence center, and a sentence end. Probability at which a starting position of a key word occurs in these regions is statistically studied based upon a large amount of stored speech data, and then the statistically studied probability is set as occurrence probability of the item corresponding to the key word.

The candidate selecting unit 8 refers to the occurrence probability of the item with respect to the speech region, and based upon the information about the starting positions of a plurality of entered key word candidates, applies the occurrence probability to each of the key word candidates. Then, this candidate selecting unit 8 determines recognition orders of the key word candidates by using the acoustic likelihood degree and this occurrence probability.

As a consequence, in accordance with Embodiment 2, since the recognition orders are determined by considering the evaluated values of the key word candidate extracted position, the precision at which the key word candidate to be confirmed by the user is selected from a plurality of key word candidates can be improved.

Embodiment 3

Next, Embodiment 3 will now be explained.

Figure 6:
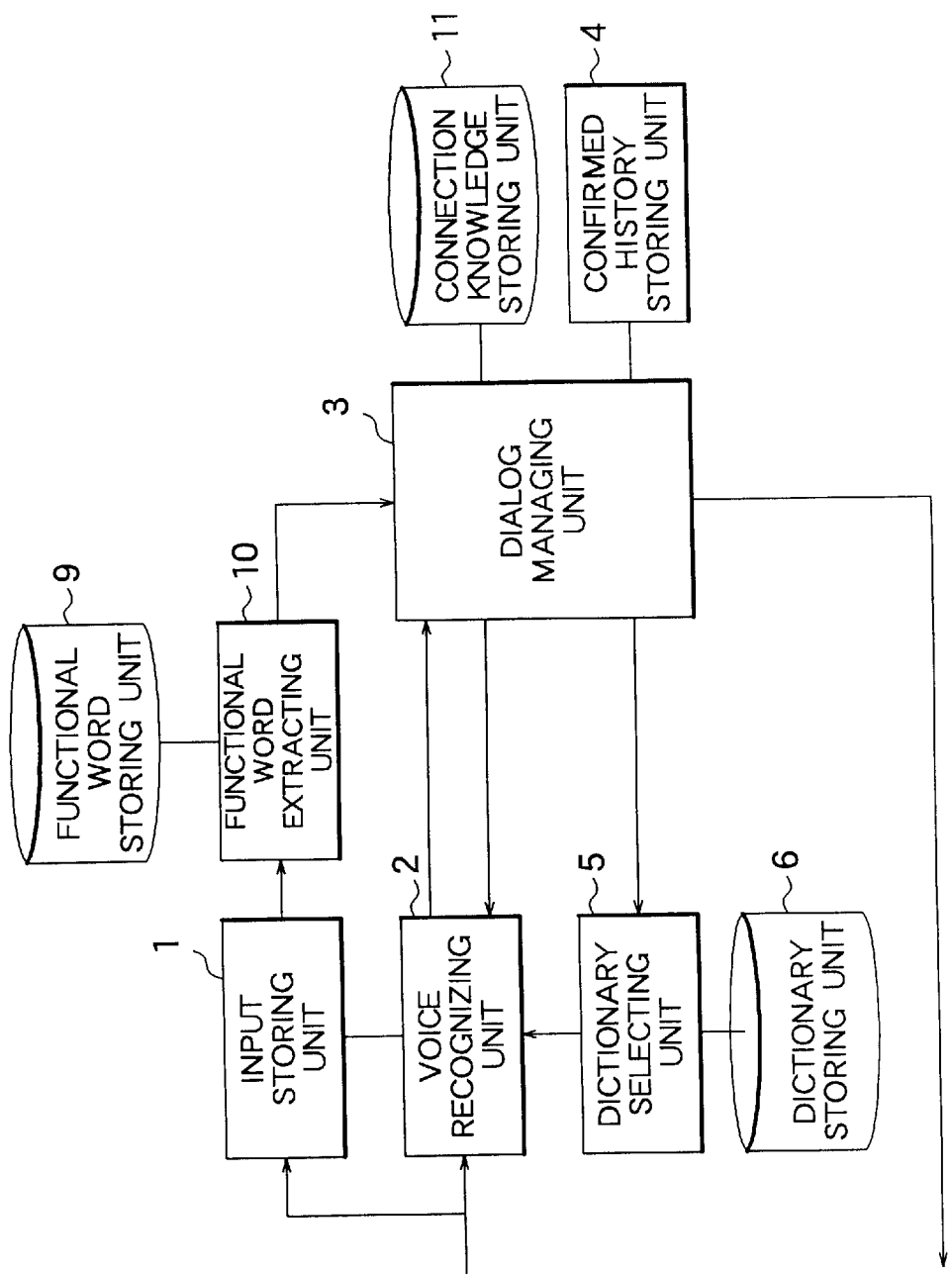
FIG. 6 is a schematic block diagram for representing an arrangement of a spoken dialog system according to Embodiment 3 of the present invention.

FIG. 6 is a schematic block diagram for representing an arrangement of a spoken dialog system according to Embodiment 3 of the present invention.

It should be understood that the same reference numerals shown in FIG. 1 will be employed as those for denoting the same, or similar structural portions of FIG. 6, and descriptions thereof are omitted. As new reference numerals, the following reference numerals are employed. Reference numeral 9 indicates a functional word storing unit for storing therein a word other than a key word as a functional word in combination with language information, and reference numeral 10 represents a functional word extracting unit for extracting a functional word candidate from an input voice stored in the input storing unit 1 and for transferring the extracted functional word candidate to the dialog managing unit 3. Also, reference numeral 11 shows a connection knowledge storing unit for storing therein a connection relationship between an item and a functional word.

In Embodiment 3, for example, the functional word storing unit 9 defines the below-mentioned language expression other than the key word as a functional word being connectable to a key word, and then stores therein the defined functional language as a recognized dictionary. The language expression is made by chaining a particle, an auxiliary verb, a suffix, and a verb such as "NO", "NO-DESUNE", "NAN-DESUNE", "NI-ARU", and "NAI NO". As the language information applied to the respective functional words, general morpheme information including a part of speech and a word with conjugated endings in a conjugated form.

The functional word extracting unit 10 recognizes the input voice of the input storing unit 1 by employing the recognized dictionary of the functional word stored in the functional word storing unit 9, and outputs a plurality of functional word candidates in such a format as shown in FIG. 7.

In the connection knowledge storing unit 11, a connection rule between each item and language information of a functional word is defined by listing up, for example, the format of <city name>: <particle; "NO">, and <city name>: <particle; "NI">. The dialog managing unit 3 selects from the input functional word candidates, with reference to this connection rule, the functional word candidates, functional word candidates adjacent in time to the determined key word and meeting the connection rule. Of these selected functional word candidates, the dialog managing unit 3 further selects such a functional word candidate having the best acoustic likelihood degree.

For instance, in the case that the key word candidate "KAMAKURA-SHI (KAMAKURA city)" in the first recognition order shown in FIG. 3 is a determined key word, both the functional word candidate "NO" in the first recognition order shown in FIG. 7, and the functional word candidate "NO-DESUNE" in the third recognition order are adjacent in time to each other. Also, both these key word candidate and functional word candidate satisfy the connection rule. As a result, the functional word candidate "NO" in the first recognition order is selected.

When the functional word candidate is selected, the dialog managing unit 3 sets the section up to the end terminal position of the selected functional word candidate as a language expression section related to the determined key word; and updates the starting terminal position of the confirmation section to be again recognized to the end terminal position of the functional word candidate; and thereafter notifies the updated end terminal position to the voice recognizing unit 2.

As a consequence, in accordance with this embodiment 3, since the language expression other than the key word located adjacent to the determined key word is extracted and also the recognition section is limited so as to once again recognized the key word, the spoken dialog system can execute the recognition process operation in a high efficiency.

It should also be noted that although the spoken dialog system according to this embodiment 3 is realized by adding the functional word storing unit 9, the functional word extracting unit 10, and the connection knowledge storing unit 11 to the spoken dialog system according to Embodiment 1 shown in FIG. 1, this spoken dialog system of Embodiment 3 may be alternatively realized by similarly adding these structural units 9, 10, 11 to the spoken dialog system of Embodiment 2 shown in FIG. 5.

Embodiment 4

Next, Embodiment 4 will now be explained.

Figure 8:
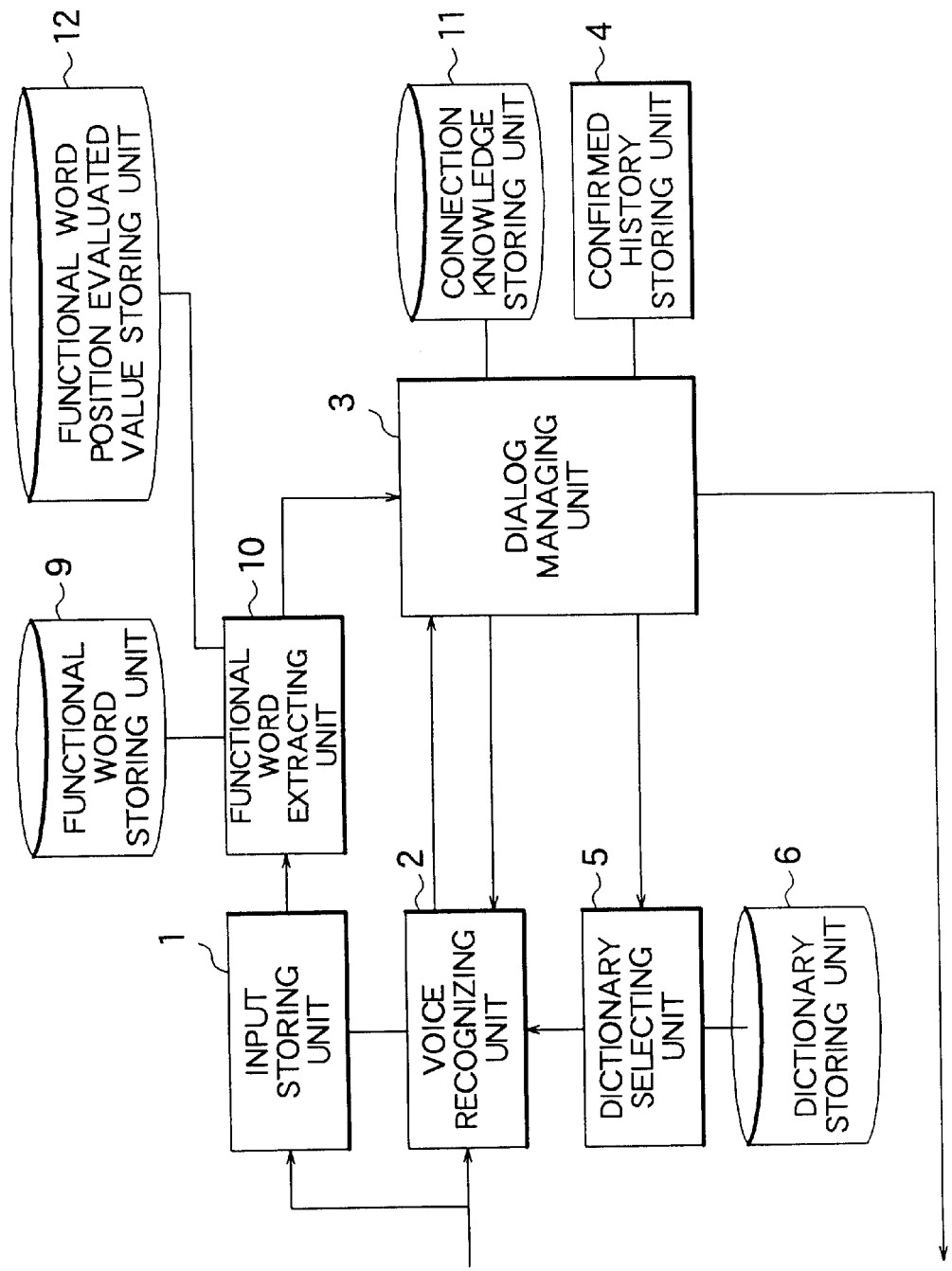
FIG. 8 is a schematic block diagram for showing an arrangement of a spoken dialog system according to Embodiment of the present invention.

FIG. 8 is a schematic block diagram for representing an arrangement of a spoken dialog system according to Embodiment 4 of the present invention.

It should be understood that the same reference numerals shown in FIG. 6 according to Embodiment 3 will be employed as those for denoting the same, or similar structural portions of FIG. 8, and descriptions thereof are omitted. As new reference numerals, the following reference numerals are employed. Reference numeral 12 shows a functional word position evaluated value storing unit for storing therein an evaluated value of a position of a functional word contained in a speech.

For instance, as a general language knowledge, functional words such as "NO-DESUNE" and "NI-ARU" has an attributive modification function, and a subject to be modified succeeds these functional words. As a result, it may be considered such that a linguistical reliability degree of functional word candidates such as "NO-DESUNE" and "NI-ARU" is low, which will appear at a sentence end. Such a language knowledge is stated in the functional word position evaluated value storing unit 12 as the following rule:

"If a functional word having an attributive modification characteristic is located at an ending of a sentence, then a reliability degree of this functional word is subtracted by 1".

Otherwise, similar to Embodiment 2, a speech section of a user is subdivided into three regions of a sentence opening, a sentence center, and a sentence end. Probability at which a starting position of a functional word occurs in these regions is statistically studied based upon a large amount of stored speech data, and then the statistically studied probability is set as occurrence probability of the item corresponding to the functional word.

The functional word extracting unit 10 refers to the evaluated value, and applies the evaluated value to each of the functional word candidates. Then, the functional word extracting unit 10 determines the recognition orders of the functional word candidates based upon the acoustic likelihood degree and the evaluated value.

As a consequence, in accordance with Embodiment 4, since the recognition orders are determined by considering the evaluated values of the temporal positions of the functional word candidates, the precision at which the functional word is extracted can be improved.

Embodiment 5

Next, Embodiment 5 will now be explained.

Figure 9:
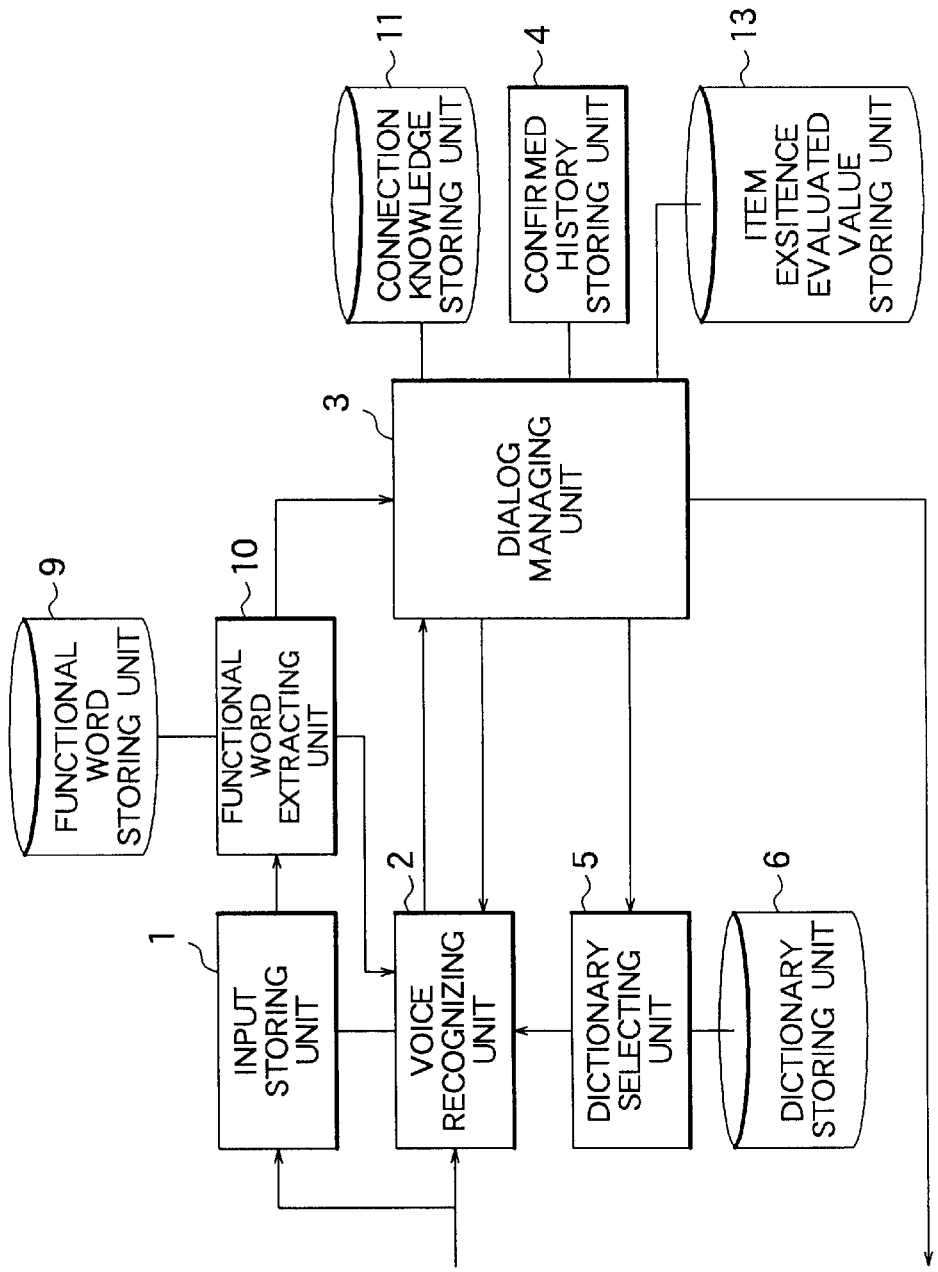
FIG. 9 is a schematic block diagram for representing an arrangement of a spoken dialog system according to Embodiment 5 of the present invention.

FIG. 9 is a schematic block diagram for representing an arrangement of a spoken dialog system according to Embodiment 5 of the present invention.

It should be understood that the same reference numerals shown in FIG. 6 according to Embodiment 3 will be employed as those for denoting the same, or similar structural portions of FIG. 9, and descriptions thereof are omitted. As new reference numerals, the following reference numerals are employed. Reference numerals 13 represents an item existence evaluated value storing unit for storing therein an evaluated value with respect to existence of items before/after a functional word.

For instance, a functional word "DESU" corresponds to an terminating form of an auxiliary verb "DESU", and it is conceivable that an item frequently appears in front of the functional word "DESU", rather than appears after this functional word. Otherwise, another functional word "NO- DESUNE" involves a case particle "NO" having an attributive modification nature, and it is conceivable that an item will appear in front of this functional word, and furthermore after this functional word. Such a linguistic feature is statistically studied as such an occurrence probability at which an item exists in front of and also after a certain functional word based upon a large amount of stored speech data, and is saved as an evaluated value of the item existence evaluated value storing unit 13.

The dialog managing unit 3 updates a recognition section of recognition performed again by referring to a functional word candidate in a voice section other than such a section where a determined key word is occupied, and also the above-described evaluated value of the item existence which corresponds to the functional word candidate. For example, when the determined key word is "KAMAKURA-SHI (KAMAKURA city)", in such a case that both a functional word candidate "NO-DESUNE" which may be adjacent to and connected to this determined key word, and another functional word candidate "DESU" located at a post-position apart from the defined key word are extracted with high acoustic likelihood degrees, the dialog managing unit 3 selects the pre-positional voice section where the occurrence probability of the item becomes higher by referring to such an occurrence probability at which the items are present before/after the functional word candidate "DESU". Then, this dialog managing unit 3 sets the recognition section of the re-recognition to such a section sandwiched between the functional word candidate "NO-DESUNE" and the functional word candidate "DESU".

As a consequence, in accordance with Embodiment 5, since the recognition section used to once again recognize the key word is limited by utilizing such an occurrence probability at which the items appear before/after the functional word candidate, the re-recognition process operation can be effectively carried out.

It should be understood that the spoken dialog system of Embodiment 5 is realized by adding the item existence evaluated value storing unit 13 to the spoken dialog system of Embodiment 3 shown in FIG. 6. Similarly, this spoken dialog system of Embodiment 5 may be accomplished by adding such an item existence evaluated value storing unit 13 to the spoken dialog system of Embodiment 4 as shown in FIG. 8.

Embodiment 6

Next, Embodiment 6 will now be explained.

Figure 10:
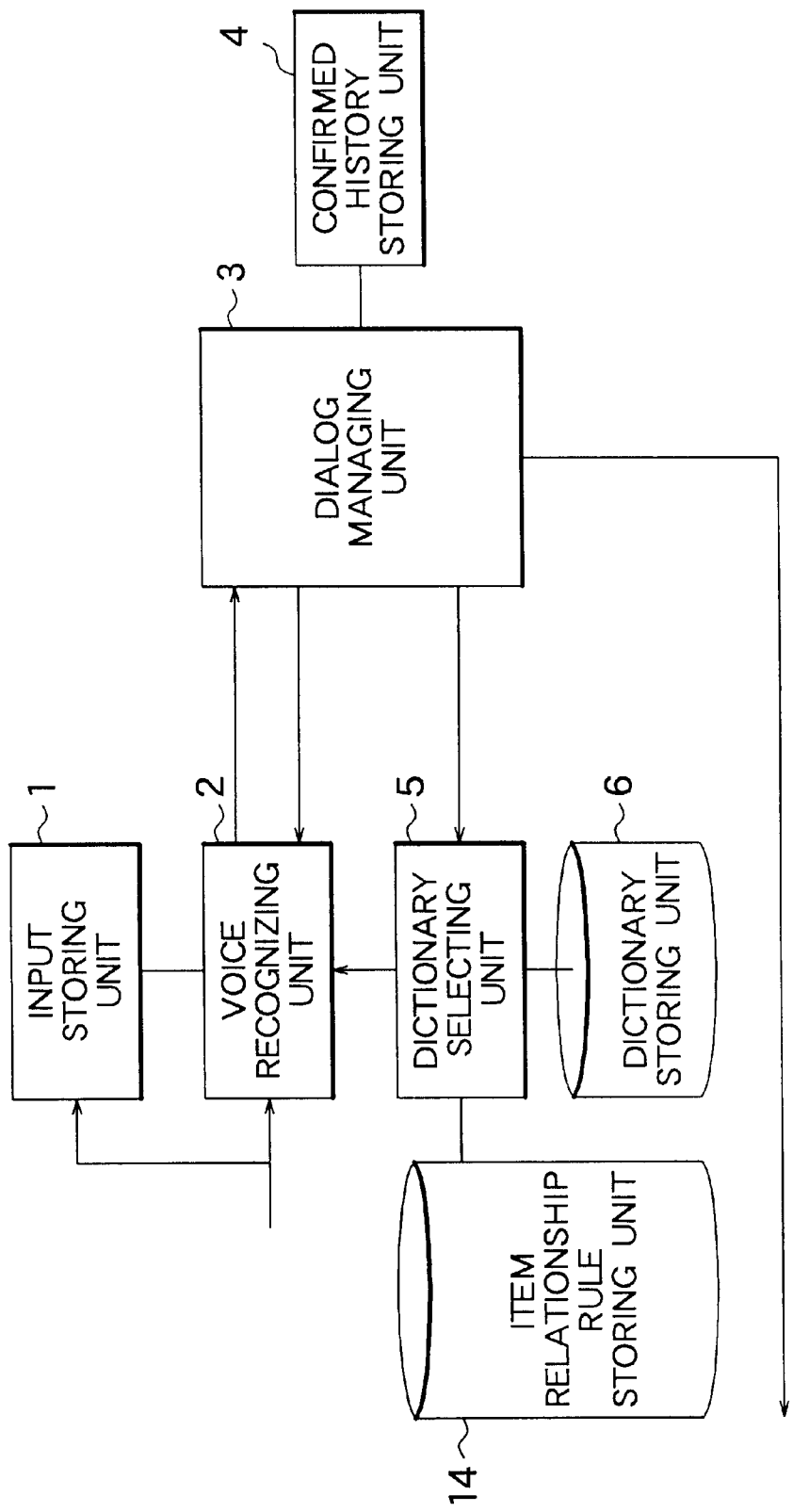
FIG. 10 is a schematic block diagram for showing an arrangement of a spoken dialog system according to Embodiment 6 of the present invention.

FIG. 10 is a schematic block diagram for representing an arrangement of a spoken dialog system according to Embodiment 6 of the present invention.

It should be understood that the same reference numerals shown in FIG. 1 according to Embodiment 1 will be employed as those for denoting the same, or similar structural portions of FIG. 10, and descriptions thereof are omitted. As new reference numerals, the following reference numerals are employed. Reference numeral 14 shows an item relationship rule storing unit for storing therein a cooccurrence relationship among items as an item relationship rule.

The item relationship rule is such a rule that a cooccurrence relationship between an item corresponding to a determined key word and an item to be once again recognized is described in a format shown in FIG. 11. For instance, a rule 1 defines that when <KEN MEI (prefecture name)> is obtained as an item of a determined key word, the following definition is made: The items to be reconfirmed are <SHI MEI (city name)>, <CHO-SON MEI (town name)>, and <TAISHO MEI (subject name)>.

The dictionary selecting unit 5 selects an item capable of satisfying the above-described item relationship rule among items which have not yet determined as an item to be once again recognized by referring to a determined key word list contained in dictionary selection information; selects from the dictionary storing unit 6 key words corresponding to this item to be once again recognized and also corresponding to the determined key word; and then provides the selected key words to the voice recognizing unit 2 as a recognized dictionary.

As a consequence, in accordance with Embodiment 6, since the item to be again recognized is limited to such an item which can co-occur with the determined item with employment of the item relationship rule, the recognized vocabulary which is used for the re-recognition can be limited.

It should be understood that the spoken dialog system of Embodiment 6 is realized by adding the item relationship rule storing unit 14 to the spoken dialog system of Embodiment 1 shown in FIG. 1. Similarly, this spoken dialog system of Embodiment 6 may be accomplished by adding such an item relationship rule storing unit 14 to the spoken dialog systems of Embodiment 2 to 5.

Embodiment 7

Next, Embodiment 7 will now be explained.

Figure 12:
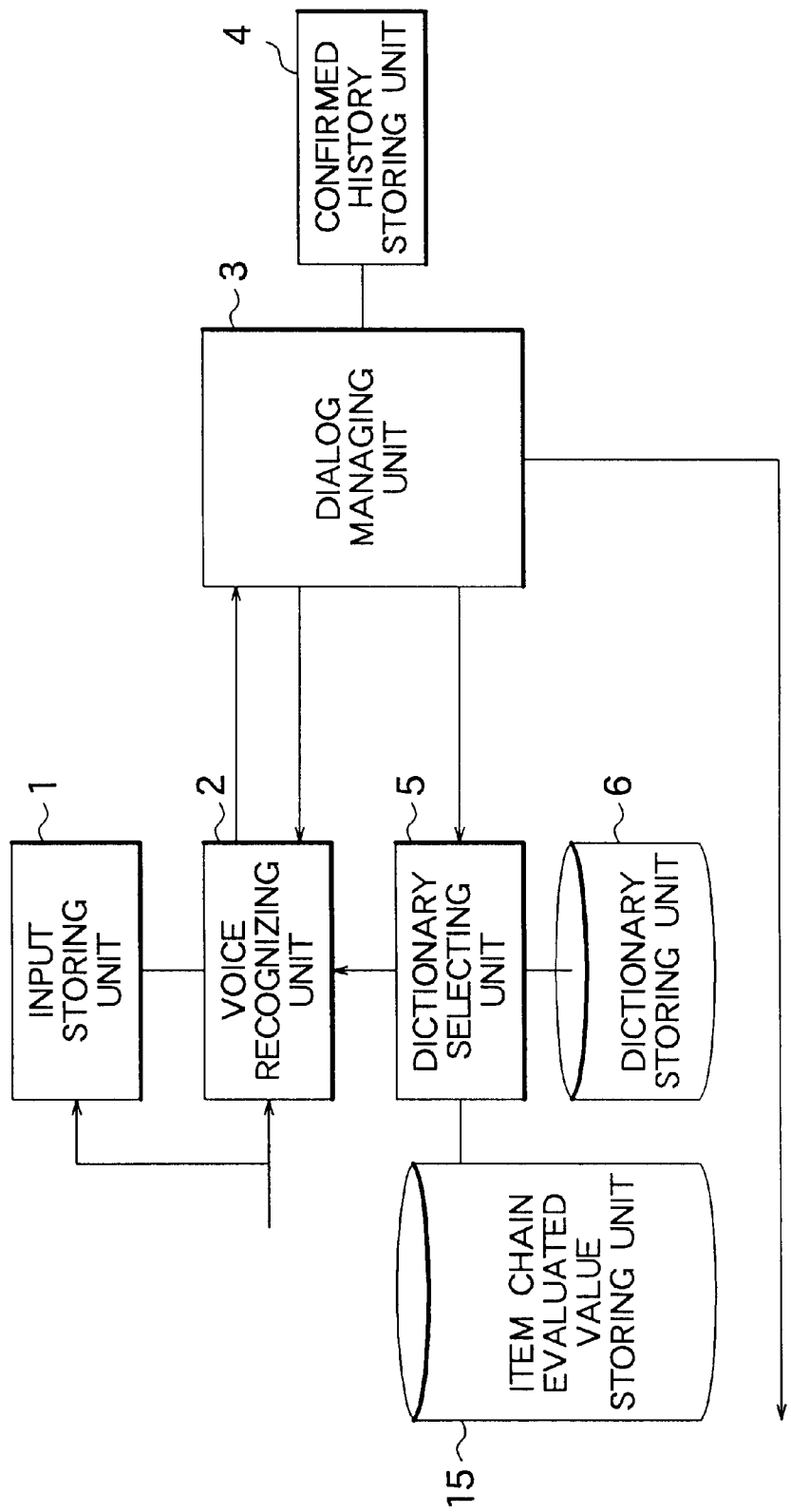
FIG. 12 is a schematic block diagram for indicating an arrangement of a spoken dialog system according to Embodiment 7 of the present invention.

FIG. 12 is a schematic block diagram for representing an arrangement of a spoken dialog system according to Embodiment 7 of the present invention.

It should be understood that the same reference numerals shown in FIG. 1 according to Embodiment 1 will be employed as those for denoting the same, or similar structural portions of FIG. 10, and descriptions thereof are omitted. As new reference numerals, the following reference numerals are employed. Reference number 15 represents an item chain evaluated value storing unit for storing therein an evaluated value corresponding to an item chain.

FIG. 11 shows an item chain table stored in the item chain evaluated value storing unit 15. This item chain table defines an occurrence probability of two-set item chains. The occurrence probability is statistically studied and obtained in advance based upon a large amount of saved speech data. The present invention is not limited to the two sets of item chains to be stored, but may be applied to three sets of item chains to be stored.

The dictionary selecting unit 5 selects such an item which can be chained to the item to be recognized among items which have not yet determined by referring to a determined key word list contained in dictionary selection information; and applies chain probability to each of the item chains by referring to the item chain table. Next, such an item in which this cain probability is larger than or equal to a preset probability value is selected by the dictionary selecting unit 5 as an item to be again recognized. Then, key words corresponding to this item to be again recognized and the determined key word are selected from the dictionary storing unit 6, and the selected key words are supplied as a recognized dictionary to the voice recognizing unit 2.

As a consequence, in accordance with Embodiment 7, since the item to be again recognized is selected by utilizing the occurrence probability of the item chain, the recognized vocabulary employed in the re-recognition can be limited while using the actual voice by the user as the reference.

It should be understood that the spoken dialog system of Embodiment 7 is realized by adding the item chain evaluated value storing unit 15 to the spoken dialog system of Embodiment 1 shown in FIG. 1. Similarly, this spoken dialog system of Embodiment 7 may be accomplished by adding such an item chain evaluated value storing unit 15 to the spoken dialog systems of Embodiments 2 to 6.

Embodiment 8

Next, Embodiment 8 will now be explained.

Figure 14:
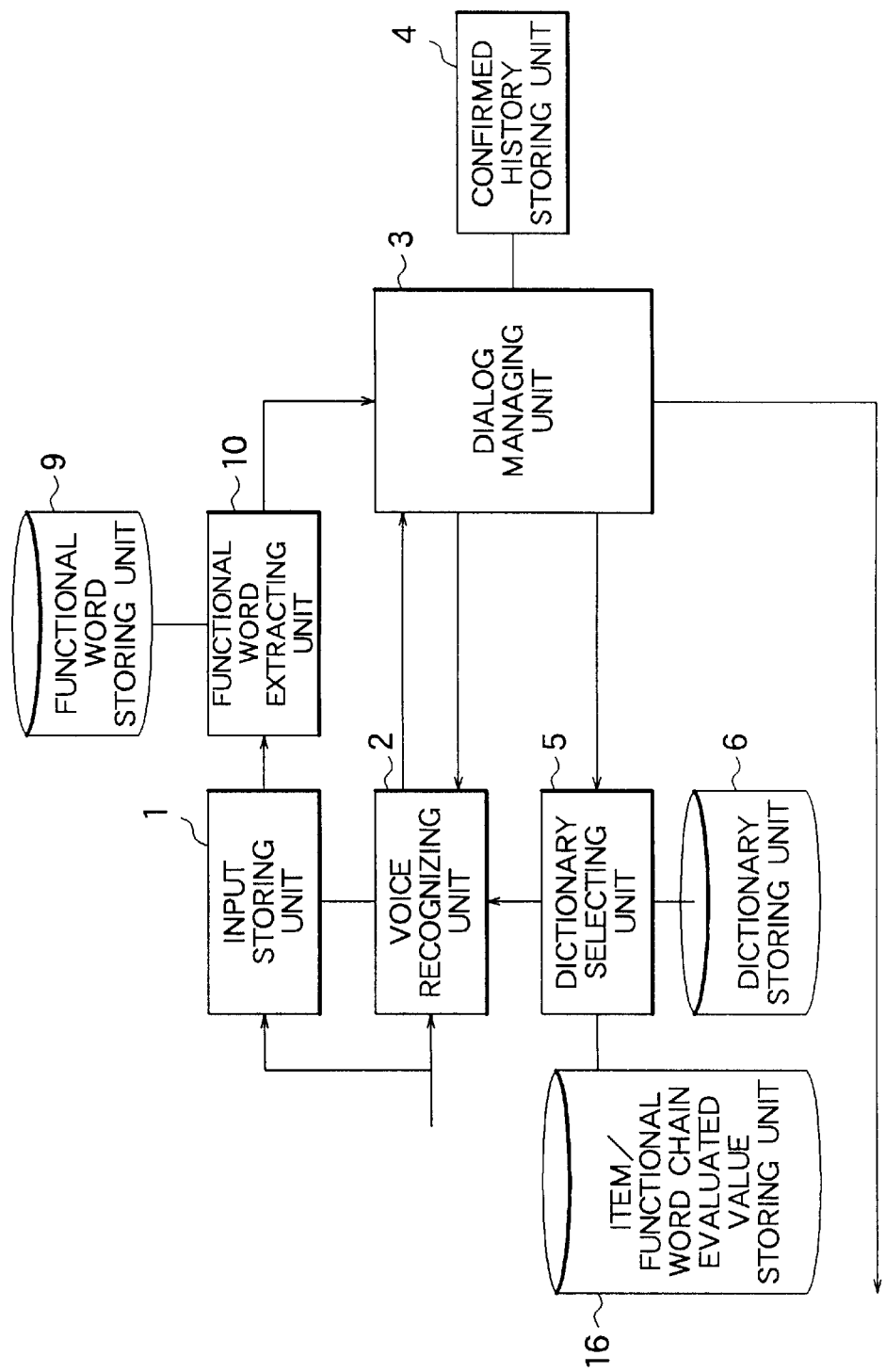
FIG. 14 is a schematic block diagram for indicating an arrangement of a spoken dialog system according to Embodiment 8 of the present invention.

FIG. 14 is a schematic block diagram for representing an arrangement of a spoken dialog system according to Embodiment 8 of the present invention.

It should be understood that the same reference numerals shown in FIG. 6 according to Embodiment 3 will be employed as those for denoting the same or similar structural portions of FIG. 14, and descriptions thereof are omitted. As now reference numerals, the following reference numerals are employed. Reference numeral 16 shows an item/functional word chain evaluated value storing unit for storing therein chain probability as an evaluated value of an item chain with respect to a set of an item and a functional word. It should be noted that although the above-explained connection knowledge storing unit 11 is not provided with the spoken dialog system shown in FIG. 14, this connection knowledge storing unit 11 may be additionally provided with this system, so that a similar operation to that of Embodiment 3 may be carried out.

FIG. 15 indicates an item/functional word chain table saved in the item/functional word chain evaluated value storing unit 16. This item/functional word chain table is used to define chain probability of three-set chains between items and functional words. The chain probability is statistically studied and obtained in advance based upon a large amount of saved speech data. As apparent from a chain 8 of FIG. 15, for example, the chain probability obtained in this manner becomes such an evaluated value (chain probability: 0.00). That is, this evaluated value reflects a linguistic connection relationship such that the following speech is not made, namely an item "personal name" succeeds a chain between an item "town name" and a functional word "NI-ARU".

The dialog managing unit 3 transfers a functional word candidate connectable to a determined key word to the dictionary selecting unit 5. Then, this dictionary selecting unit 5 selects such an item which can be chained to an item to be recognized among items which have not yet been determined by referring to a determined key word list contained in dictionary selection information. While referring to the item/functional word chain table, the dictionary selecting unit 5 applies chain probability to each of the item/functional word chains based upon the set constructed of this not-yet-determined item, the item to be recognized, and the functional word candidate sent from the dialog managing unit 3. The dialog managing unit 3 selects the item whose chain probability is higher than or equal to a preset probability value as an item to be again recognized; and selects key words corresponding to this item to be again recognized and the determined key word from the dictionary storing unit 6; and also provides the selected key words as a recognized dictionary to the voice recognizing unit 2.

Accordingly, in accordance with Embodiment 8, since the item to be again recognized is selected by utilizing the chain probability between the item and the functional word, the recognized vocabulary which is used for the re-recognition can be limited by reflecting the linguistic connection relationship of the functional word.

It should be understood that the spoken dialog system of Embodiment 8 is realized by adding the item/functional word chain evaluated value storing unit 16 to the spoken dialog system of Embodiment 3 shown in FIG. 6. Similarly, this spoken dialog system of Embodiment 8 may be accomplished by adding such an item/functional word chain evaluated value storing unit 16 to the spoken dialog systems of Embodiments 4 and 5.

Embodiment 9

Next, Embodiment 9 will now be explained.

Figure 16:
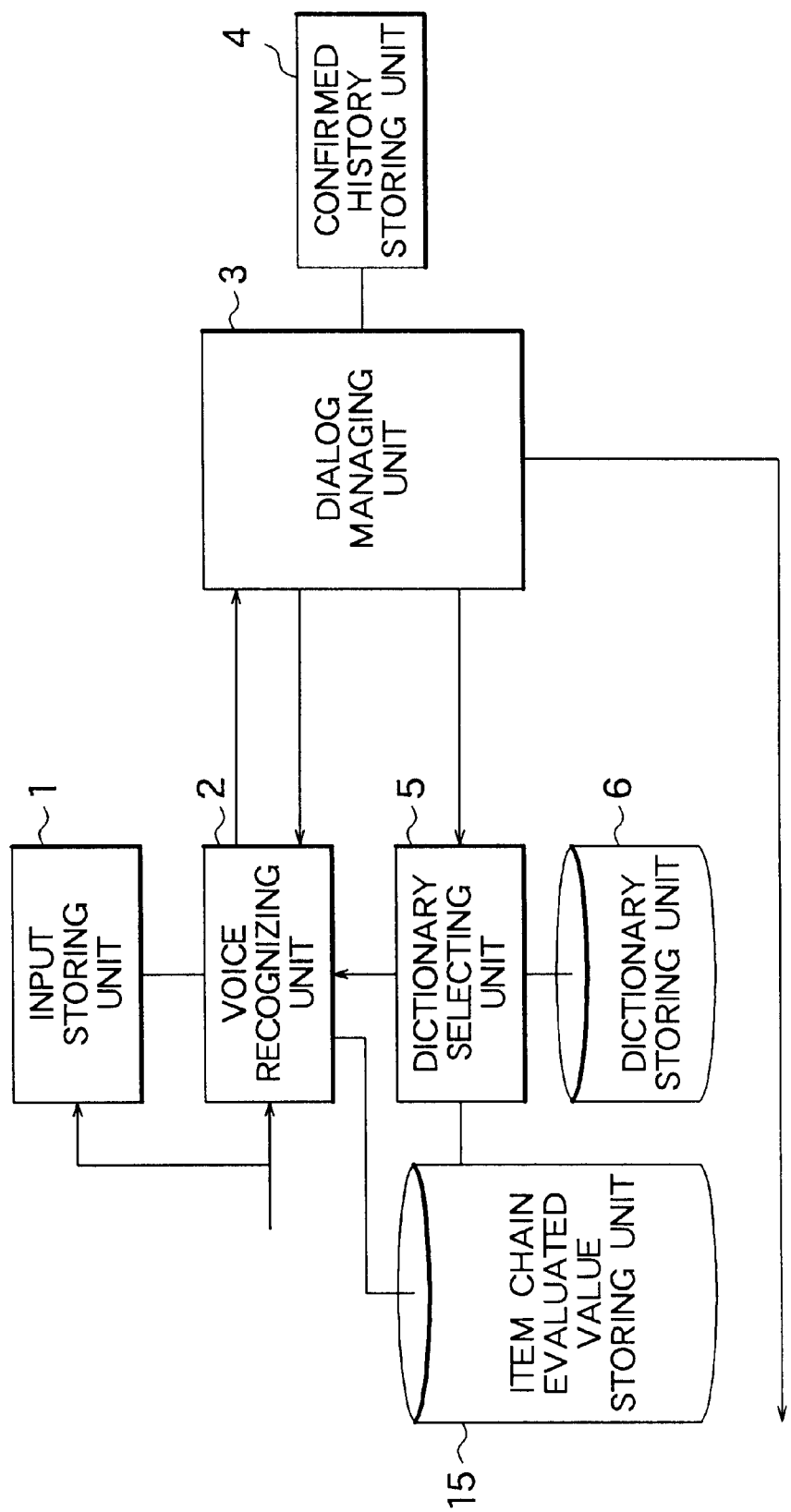
FIG. 16 is a schematic block diagram for indicating an arrangement of a spoken dialog system according to Embodiment 9 of the present invention.

FIG. 16 is a schematic block diagram for representing an arrangement of a spoken dialog system according to Embodiment 9 of the present invention.

It should be understood that the spoken dialog system according to Embodiment 9 shown in FIG. 16 in principle employs a similar arrangement to that of Embodiment 7 indicated in FIG. 12. The voice recognizing unit 2 evaluates an item chain with respect to a series of key word candidates corresponding to a recognition candidate by referring to an item chain evaluated value in the item chain evaluated value storing unit 15.

In other words, in FIG. 16, the dictionary selecting unit 5 notifies both an item of a determined key word and an item to be again recognized to the voice recognizing unit 2. This voice recognizing unit 2 calculates chain probability relevant to an item chain between an item of a determined key word and an item of a key word candidate to be again recognized in a re-recognition process operation by referring to an item chain table of the item chain evaluated value storing unit 15. Then, the voice recognizing unit 2 applies this resultant chain probability as an evaluated value for a key word candidate under recognition, and determines a recognition order of key word candidates based upon an acoustic likelihood degree and an evaluated value.

As a consequence, in accordance with Embodiment 9, since the item chain probability is used as the evaluated value for the key word candidate while performing the recognition process operation in the voice recognizing unit 2, the voice recognition precision can be improved.

Embodiment 10

Next, Embodiment 10 will now be explained.

Figure 17:
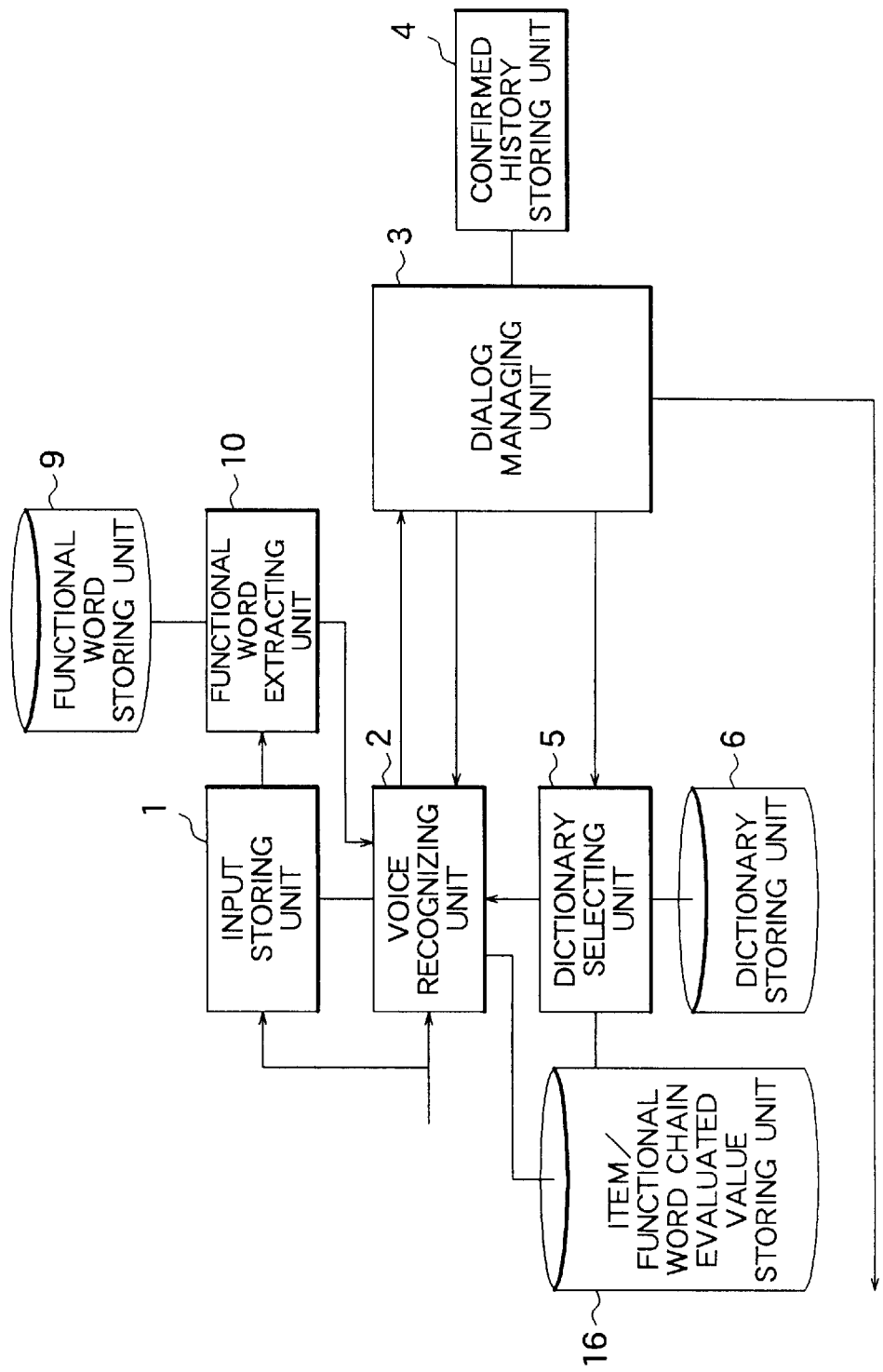
FIG. 17 is a schematic block diagram for showing an arrangement of a spoken dialog system according to Embodiment 10 of the present invention.

FIG. 17 is a schematic block diagram for representing an arrangement of a spoken dialog system according to Embodiment 10 of the present invention.

It should be understood that the spoken dialog system according to Embodiment 10 shown in FIG. 17 in principle employs a similar arrangement to that of Embodiment 8 indicated in FIG. 16. The voice recognizing unit 2 evaluates an item chain with respect to a series of key word candidates corresponding to a recognition candidate by referring to an item/functional word chain evaluated value of the item/functional word chain evaluated value storing unit 16, and also a functional word candidate derived from a functional word extracting unit 10.

In other words, in FIG. 17, the dictionary selecting unit 5 sends both an item of a determined key word and an item to be again recognized to the voice recognizing unit 2. Also, the functional word extracting unit 10 sends a functional word candidate extracted from an input voice of the input storing unit 1 to the voice recognizing unit 2.

The voice recognizing unit 2 calculates chain probability relevant to an item/functional word chain among an item of a determined key word, a functional word candidate, and an item of a key word candidate to be again recognized in a re-recognition process operation by referring to an item/functional word chain table of the item/functional word chain evaluated value storing unit 16. Then, the voice recognizing unit 2 applies this resultant chain probability as an evaluated value for a key word candidate under recognition, and determines a recognition order of key word candidates based upon an acoustic likelihood degree and an evaluated value.

As a consequence, in accordance with Embodiment 10, since the item/functional word chain probability is used as the evaluated value for the key word candidate while performing the recognition process operation in the voice recognizing unit 2, the voice recognition precision can be improved.

Embodiment 11

Next, Embodiment 11 will now be explained.

Figure 18:
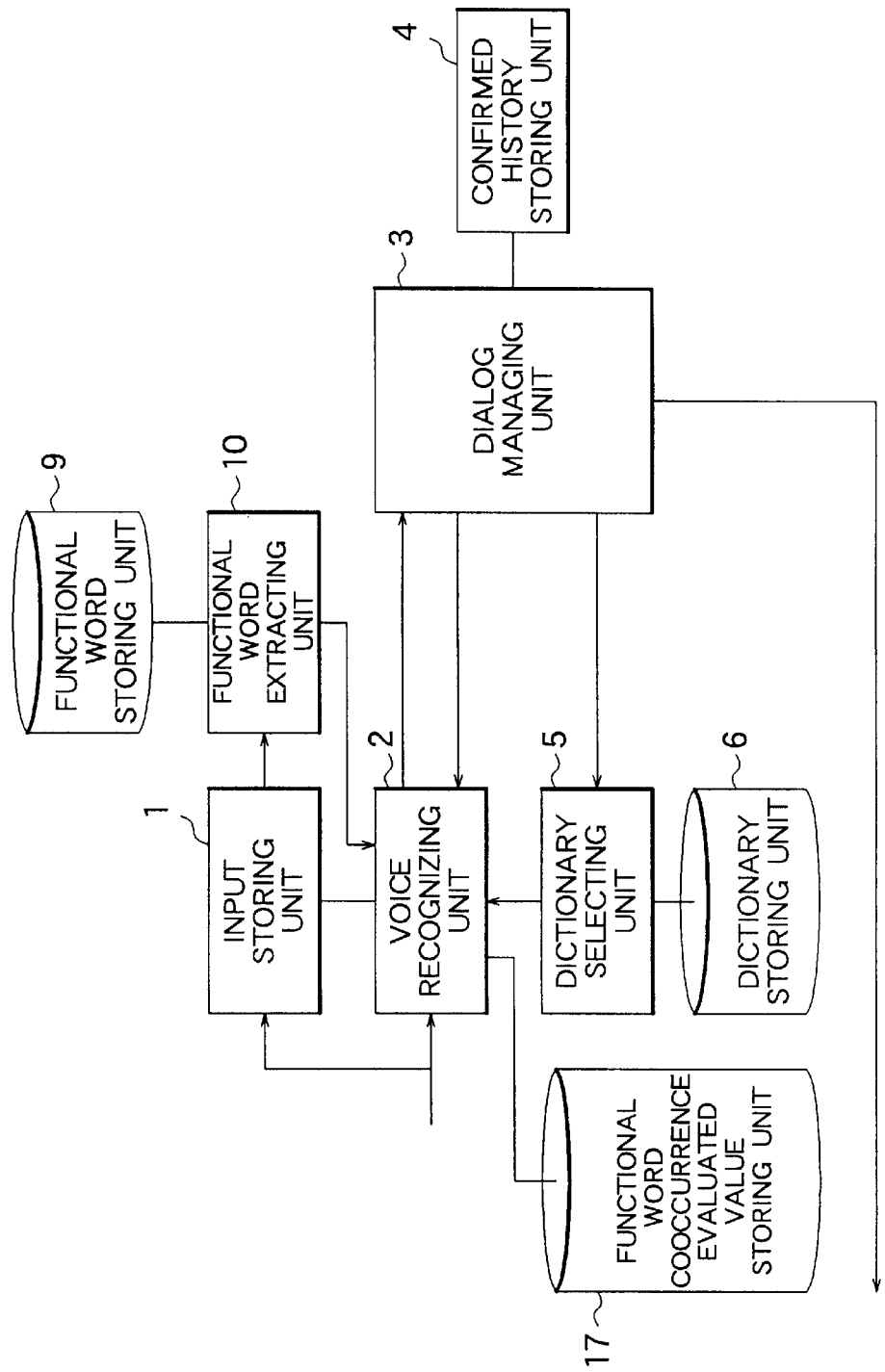
FIG. 18 is a schematic block diagram for representing an arrangement of a spoken dialog system according to Embodiment 11 of the present invention.

FIG. 18.is a schematic block diagram for representing an arrangement of a spoken dialog system according to Embodiment 11 of the present invention.

It should be understood that the same reference numerals shown in FIG. 6 according to Embodiment 3 will be employed as those for denoting the same, or similar structural portions of FIG. 18, and descriptions thereof are omitted. As new reference numerals, the following reference numerals are employed. Reference numeral 17 indicates a functional word cooccurrence evaluated value storing unit for storing therein an evaluated value of a cooccurrence relationship among functional words. It should also be noted that although the spoken dialog system of FIG. 18 is not equipped with the connection knowledge storing unit 11, when this connection knowledge storing unit 11 is employed, this spoken dialog system shown in FIG. 18 may be operated in a similar manner to that of Embodiment 3.

Also, FIG. 19 represents a functional word cooccurrence table saved in the functional word cooccurrence evaluation value storing unit 17. This functional word cooccurrence table is used to define a cooccurrence probability as an evaluated values of a set of functional words existing before/after an item.

For example, in the case of such an expression in Japanese as <item 1> NO <item 2> NAN-DESUGA", it is so assumed that a cooccurrence probability of such a functional word "NAN-DESUGA" is used as an evaluated value under such a cooccurrence condition that a functional word "NO" cooccurs with the first-mentioned functional word "NAN-DESUGA". The cooccurrence probability is statistically studied and obtained in advance based upon a large amount of saved speech data. Thus, the calculated cooccurrence probability becomes such an evaluated value (cooccurrence probability: 0.00). That is, for example, as seen from a cooccurrence 3 of FIG. 19, a linguistic cooccurrence relationship such that a functional word "NI" and another functional word "DESU" do not co-occur is reflected onto this evaluated value.

In FIG. 18, the functional word extracting unit 10 supplies a functional word candidate extracted from an input voice of the input storing unit 1 to the voice recognizing unit 2. The voice recognizing unit 2 calculates cooccurrence probability related to a set of functional words existing before/after a certain key word candidate during the re-recognition process operation with reference to the functional word cooccurrence table in the functional word cooccurrence evaluated value storing unit 17. Then, the voice recognizing unit 2 applies this resultant cooccurrence probability as an evaluated value for a key word candidate under recognition so as to determine a recognition order of key word candidates based on both the acoustic likelihood degree and the evaluated value.

As a consequence, in accordance with Embodiment 11, since the cooccurrence probability of the functional word is used as the evaluated value for the key word candidate while performing the recognition process operation in the voice recognizing unit 2, the voice recognition precision can be improved.

It should be understood that the spoken dialog system of Embodiment 11 is realized by adding the functional word cooccurrence evaluated value storing unit 17 to the spoken dialog system of Embodiment 3 shown in FIG. 6. Similarly, this spoken dialog system of Embodiment 11 may be accomplished by adding such a functional word cooccurrence evaluated value storing unit 17 to the spoken dialog systems of Embodiments 4 to 10.

Embodiment 12

Next, Embodiment 12 will now be explained.

Figure 20:
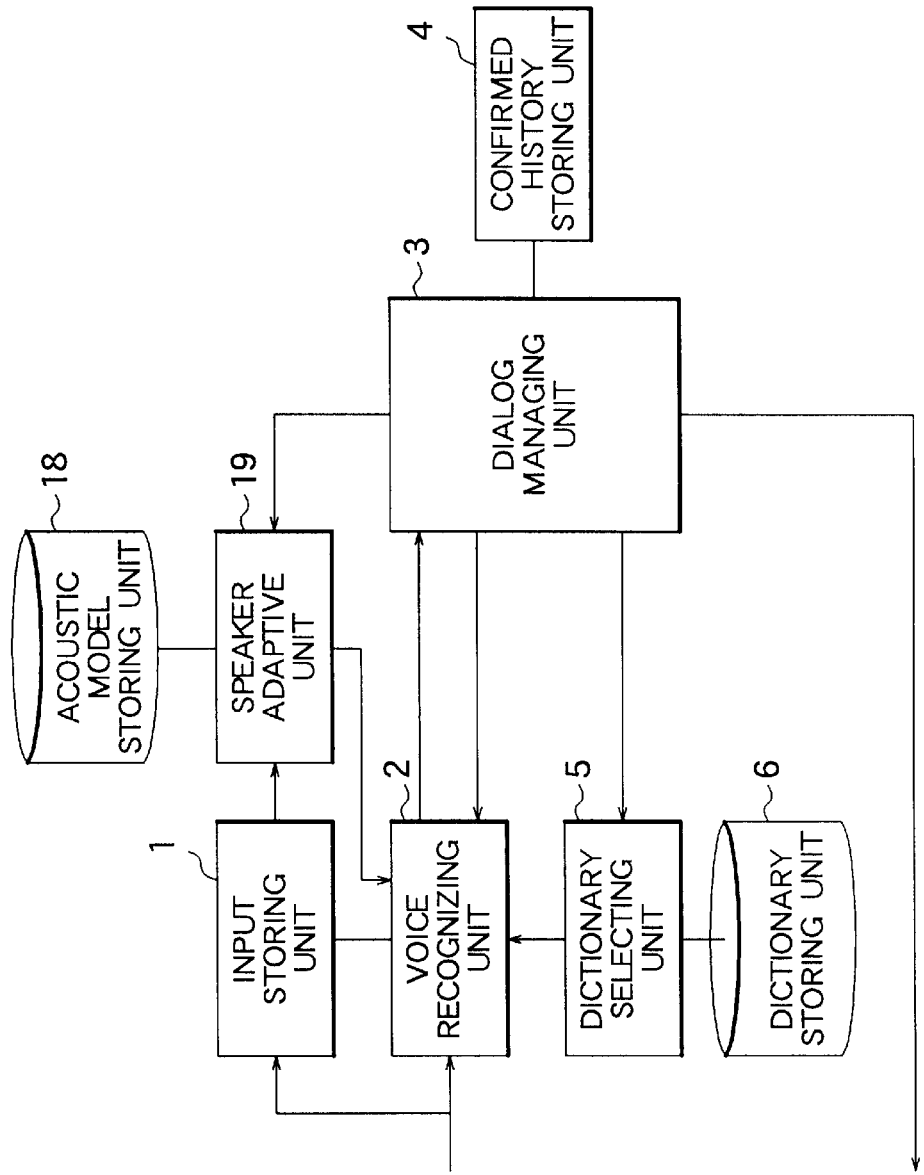
FIG. 20 is a schematic block diagram for showing an arrangement of a spoken dialog system according to Embodiment 12 of the present invention.
Figure 21:
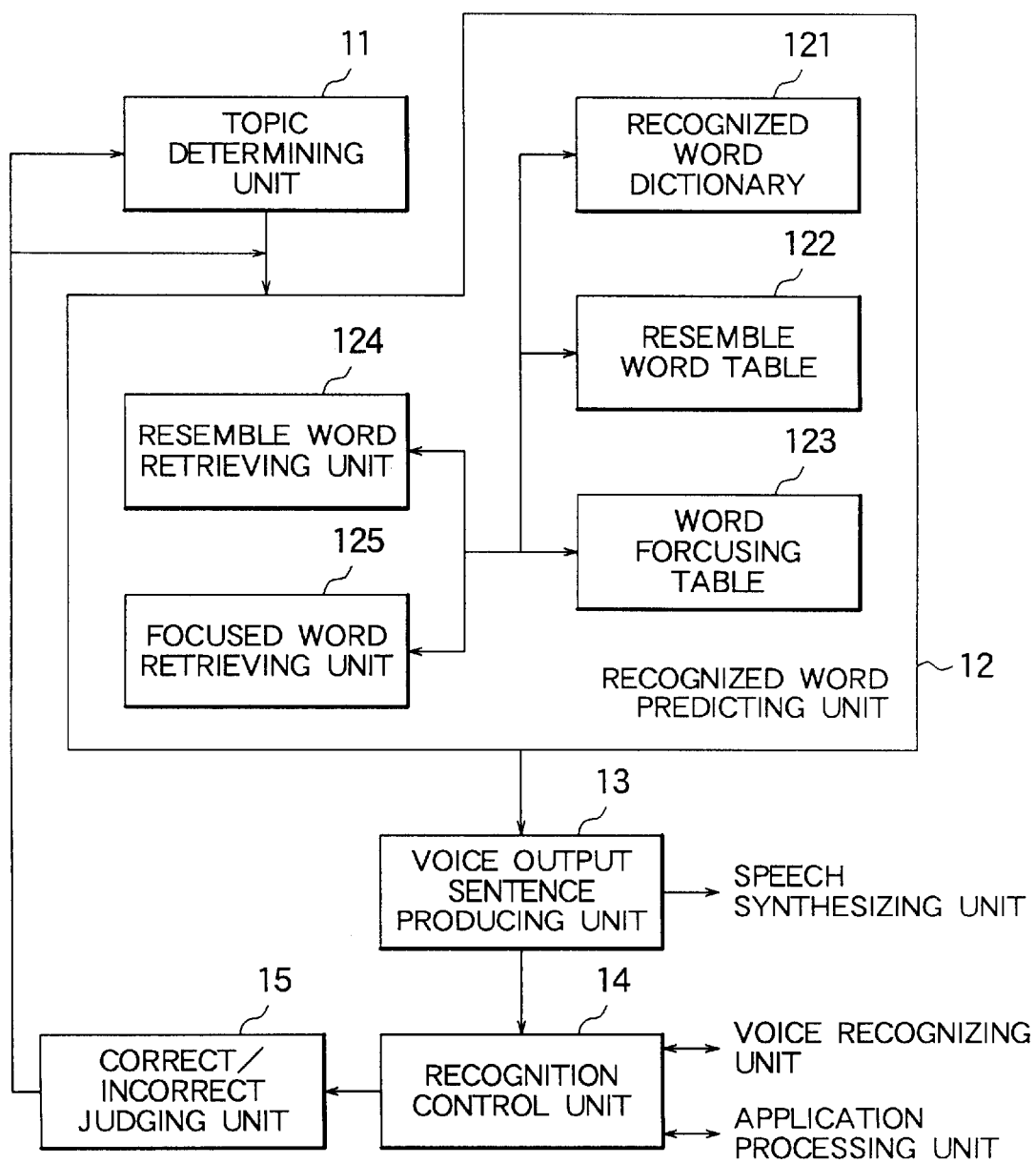
FIG. 21 is a schematic block diagram for representing an arrangement of a spoken dialog system according to the first prior art.
Figure 22:
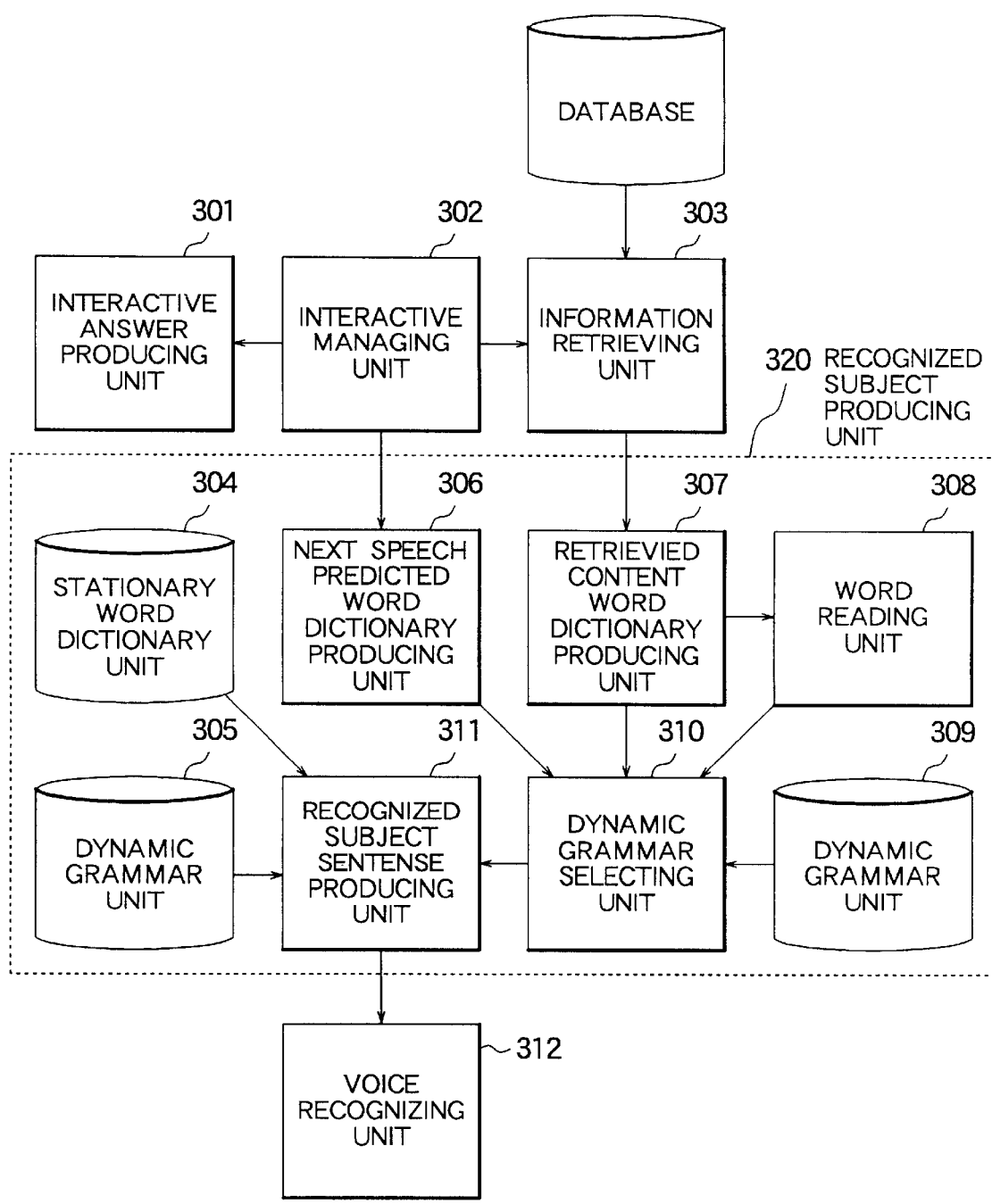
FIG. 22 is a schematic block diagram for showing an arrangement of a spoken dialog system according to the second prior art.

FIG. 20 is a schematic block diagram for representing an arrangement of a spoken dialog system according to Embodiment 12 of the present invention.

It should be understood that the same reference numerals shown in FIG. 1 according to Embodiment 1 will be employed as those for denoting the same, or similar structural portions of FIG. 20, and descriptions thereof are omitted. As new reference numerals, the following reference numerals are employed. Reference numeral 18 indicates an acoustic model storing unit for making an acoustic parameter employed in a recognition process operation by the voice recognizing unit 2 in correspondence with a language unit, and for storing therein this acoustic parameter as an acoustic model. Also, reference numeral 19 shows a speaker adaptive unit for learning a parameter of the acoustic model to update the learned parameter.

In the above-described acoustic model storing unit 18, for example, the HMM (Hidden Markov Model) is stored. This HMM is equal to an acoustic model under the statistical method, which is generally employed in the field of speech recognition. In this case, while setting a phoneme such as a vowel and a consonant in a language unit for a speech recognition, the HMM is stored every phoneme.

In FIG. 20, the dialog managing unit 3 supplies a phoneme stream "Kamakurashi" in combination with a starting terminal position and an end terminal position of a determined key word to the speaker adaptive unit 19 in such a case that, for instance, the determined key word is "KAMAKURA city" as a language expression of the determined key word.

The speaker adaptive unit 19 reads an input voice from the input storing unit 1 as a learning sample. This input voice corresponds to the section between the starting terminal position and the end terminal position of the determined key word. Then, the speaker adaptive unit 19 makes the phoneme sequence provided from the dialog managing unit 3 in correspondence with the learning sample so as to produce a teacher signal adapted to the speaker. Also, the speaker adaptive unit 19 learns the acoustic parameter of the HMM by way of a predetermined speaker adapting method to thereby update this learned acoustic parameter. The voice recognizing unit 2 performs the recognition by employing the adapted acoustic parameter of the HMM.

Furthermore, the speaker adaptive unit 19 alternatively may perform the speaker adapting operation by using the teacher signals for all of the determined key words since the interactive operation was commenced by storing a history of the teacher signal employed in the adaptive process in the confirmed history storing unit 4.

As a result, in accordance with Embodiment 12, since the input voice corresponding to the determined key word is used as the teacher signal for the speaker adapting operation, the accuracy of speech recognition can be improved. It should be understood that the spoken dialog system of Embodiment 12 is realized by adding the acoustic model storing unit 18 and the speaker adapting unit 19 to the spoken dialog system of Embodiment 1 shown in FIG. 1. Similarly, this spoken dialog system of Embodiment 12 may be accomplished by adding such arrangements to the spoken dialog Systems of Embodiments 1 to 11.

As previously described in detail, the spoken dialog system can achieve the below-mentioned advantages.

That is, in accordance with the present invention, even when the key word other than the vocabulary to be recognized is contained in the speech made by the user, the same input voice is recognized again by employing the recognized dictionary of the vocabulary related to the key word which is confirmed by the user, and thus, such a key word other than the vocabulary to be recognized can be extracted. As a consequence, the spoken dialog system can effectively execute the interactive operation by using the key word acquired by the recognition again, and also can more naturally introduce the interactive operation.

In other words, it is possible to obtain such a spoken dialog system that the word our of the set vocabulary is extracted in response to the speech containing words out of the set vocabulary in addition to the words set as the recognized dictionary. Therefore, this spoken dialog system can be effectively utilized in order to more effectively and more naturally perform the interactive operation.

Also, since the recognition orders are determined by considering the evaluated values of the key word candidate extracted position, the precision at which the key word candidate to be confirmed by the user is selected from a plurality of key word candidates can be improved.

Also, since language expressions other than the key word located adjacent to the determined key word are extracted and also the recognition section is limited so as to reconfirm the key word, the spoken dialog system can execute the re-recognition process operation in a high efficiency.

Also, since the recognition orders are determined by considering the evaluated values of the temporal positions of the functional word candidates, the precision at which the functional word is extracted can be improved.

Also, since the recognition section used to once again recognize the key word is limited by utilizing such an occurrence probability at which the items appear before/after the functional word candidate, the re-recognition process operation can be effectively carried out.

Also, since the item to be again recognized is limited to such an item which can cooccur with the determined item with employment of the item relationship rule, the recognized vocabulary which is used for the re-recognition can be limited.

Also, since the item to be again recognized is selected by utilizing the occurrence probability of the item chain, the recognized vocabulary employed in the re-recognition can be limited while using the actual voice by the user as the reference.

Also, since the item to be again recognized is selected by utilizing the occurrence probability between the item and the functional word, the recognized vocabulary which is used for the re-recognition can be limited by reflecting the linguistic connection relationship of the functional word.

Also, since the item chain probability is used as the evaluated value for the key word candidate while performing the recognition process operation, the voice recognition precision can be improved.

Also, since the item/functional word chain probability is used as the evaluated value for the key word candidate while performing the recognition process operation, the voice recognition precision can be improved.

Also, since the cooccurrence probability of the functional word is used as the evaluated value for the key word candidate while performing the recognition process operation, the voice recognition precision can be improved.

Furthermore, since the input voice corresponding to the determined key word is used as the teacher signal for the speaker adapting operation, the accuracy of speech recognition can be improved.

What is claimed is:

1. A spoken dialog system comprising:

an input storing unit for storing therein an input voice in combination with time information;

a dictionary storing unit for classifying a key word to be recognized every item so as to define the classified key word;

a dictionary selecting unit for selecting a key word corresponding to designated dictionary selection information from said dictionary storing unit to thereby output the selected key word as a recognized dictionary;

a voice recognizing unit for recognizing an input voice or the input voice in said input storing unit with respect to a designated recognition section with employment of the recognized dictionary selected from said dictionary selecting unit, and for outputting the extracted key word candidate in combination with the recognition section;

a confirmed history storing unit for storing therein a history of a determined key word every speech; and a dialog managing unit for causing a user to confirm the key word candidate outputted from said voice recognizing unit; for registering the confirmed key word candidate as a determined key word into said confirmed history storing unit; for judging as to whether or not an input voice other than the determined key word is recognized based upon both a section of the determined key word and a recognition section thereof; and for executing such operations that when the judgment result is the recognition to be once again, both an item and the determined key word are transferred as dictionary selection information to said dictionary selecting unit; a section of an input voice other than the determined key word is updated as a re-recognition section; and also the updated confirmation section is instructed to said voice recognizing unit, whereas when the judgment result is not the recognition to be once again performed, a predetermined interactive operation is carried out in response to the determined key word.

2. A spoken dialog system as claimed in claim 1, further comprising:

a key word position evaluated value storing unit for storing therein an evaluated value with respect to a key word extracted position; and a candidate selecting unit provided between said voice recognizing unit and said dialog managing unit, for referring to an evaluated value with respect to a position of a key word candidate derived from said voice recognizing unit from said key word position evaluated value storing unit, and for selecting a key word candidate to be confirmed by a user from a plurality of key word candidates corresponding to the confirmed result to thereby send the selected keyword candidate to said dialog managing unit.

3. A spoken dialog system as claimed in claim 1, further comprising:

a functional word storing unit for storing therein a word other than a key word as a functional word in combination with language information;

a connection knowledge storing unit for storing therein a connection relationship between an item and a functional word; and a functional word extracting unit provided between said input storing unit and said dialog managing unit, for referring to said functional word storing unit so as to extract a functional word candidate from the input voice stored in the input storing unit, and for sending the extracted functional word to said dialog managing unit, wherein said dialog managing unit selects a functional word candidate connectable to a determined key word by referring to the connection relationship of said connection knowledge storing unit; and updates a recognition section in a recognition once again performed by referring to time information of said functional word candidate.

4. A spoken dialog system as claimed in claim 3, further comprising:

a functional word position evaluated value storing unit for storing therein an evaluated value at a position of a functional word, wherein said functional word extracting unit selects a functional word candidate by referring to the evaluated value in said functional word position evaluated value storing unit.

5. A spoken dialog system as claimed in claim 3, further comprising:

an item existence evaluated value storing unit for storing therein an evaluated value with respect to existence of items located before/after a functional word, wherein said dialog managing unit updates a recognition section in a recognition once again performed by referring to both a functional word candidate in a voice section other than a section occupied by a determined key word, and an item existence evaluated value in said item existence evaluated value storing unit, which corresponds to said functional word candidate.

6. A spoken dialog system as claimed in claim 1, further comprising:

an item relationship rule storing unit for storing therein a cooccurrence relationship among items as an item relationship rule, wherein said dictionary selecting unit selects an item capable of satisfying the item relationship rule in said item relationship rule storing unit among not-yet-confirmed items as an item to be again recognized; and selects a key word corresponding to both the item to be again recognized and a determined key word from said dictionary storing unit to thereby provide the selected key word as a recognized dictionary to said voice recognizing unit.

7. A spoken dialog system as claimed in claim 1, further comprising:

an item chain evaluated value storing unit for storing therein an evaluated value with respect to an item chain, wherein said dictionary selecting unit employs the item chain evaluated value in said item chain evaluated value storing unit as a reference used to select an item to be again recognized among not-yet-confirmed items so as to select a key word corresponding to both the item to be again recognized and the determined key word from said dictionary storing unit.

8. A spoken dialog system as claimed in claim 3, further comprising:

an item/functional word chain evaluated value storing unit for storing therein an evaluated value of an item chain with respect to a set of an item and a functional word, and wherein:

said dialog managing unit sends a functional word candidate connectable to a determined key word to said dictionary selecting unit; and said dictionary selecting unit employs the item/functional word chain evaluated value in said item/functional word chain evaluated value storing unit as a reference used to select an item to be again recognized among not-yet-confirmed items, so as to select a key word corresponding to both the item to be again recognized and the determined key word from said dictionary storing unit.

9. A spoken dialog system as claimed in claim 7, wherein:

said dictionary selecting unit notifies the item of the determined key word and the item to be again recognized to said voice recognizing unit; and said voice recognizing unit evaluates an item chain corresponding to a series of key word candidates equal to a recognition candidate by referring to the item chain evaluated value in said item chain evaluated value storing unit.

10. A spoken dialog system as claimed in claim 8, wherein:

said dictionary selecting unit notifies both the item of the determined key word and the item to be again recognized to said voice recognizing unit;

said functional word extracting unit sends the functional word candidate extracted from the input voice in said input storing unit to said voice recognizing unit; and said voice recognizing unit evaluates an item chain corresponding to a series of key word candidates equal to a recognized candidate by referring to both the item/functional word chain evaluated value in said item/functional word chain evaluated value and also the functional word candidate extracted from said functional word extracting unit.

11. A spoken dialog system as claimed in claim 3, further comprising:

a functional word cooccurrence evaluated value storing unit for storing therein an evaluated value of a cooccurrence relationship between functional words, wherein said voice recognizing unit enters the functional word candidate from said functional word extracting unit extracted from the input voice in said input storing unit; and also evaluates a key word candidate equal to a recognized candidate and a series of functional word candidates by referring to the functional word cooccurrence evaluated value in said functional word cooccurrence value storing unit.

12. A spoken dialog system as claimed in claim 1, further comprising:

an acoustic model storing unit for storing therein an acoustic parameter in correspondence with a language unit; and a speaker adaptive unit for reading out from said input storing unit an input voice corresponding to a section of a determined key word by referring to both a language expression and a section of a determined key word entered from said dialog managing unit, and for learning a parameter of an acoustic model by employing the input voice and the language expression of the determined key word to thereby update the learned parameter of said acoustic model, wherein said voice recognizing unit recognizes an input voice by employing the updated parameter of the acoustic model derived from said speaker adaptive unit.

* * * * *